(12) United States Patent
Sherony et al.

(10) Patent No.: US 9,440,660 B2
(45) Date of Patent: Sep. 13, 2016

(54) METHOD FOR REMOTE COMMUNICATION WITH AND THROUGH A VEHICLE

(71) Applicant: Toyota Motor Engineering & Manufacturing North America, Inc., Erlanger, KY (US)

(72) Inventors: Rini Sherony, Ann Arbor, MI (US); Emery Charles Gulash, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/338,297

(22) Filed: Jul. 22, 2014

(65) Prior Publication Data

US 2016/0023665 A1 Jan. 28, 2016

(51) Int. Cl.
*B60W 50/12* (2012.01)
*G02B 27/01* (2006.01)
*G09F 21/04* (2006.01)
*G01C 21/36* (2006.01)
*B60Q 1/26* (2006.01)
*B60Q 1/50* (2006.01)
*G07C 5/00* (2006.01)
*B60W 40/09* (2012.01)
*G06F 3/01* (2006.01)

(52) U.S. Cl.
CPC .............. *B60W 50/12* (2013.01); *B60Q 1/268* (2013.01); *B60Q 1/503* (2013.01); *B60W 40/09* (2013.01); *G01C 21/365* (2013.01); *G02B 27/01* (2013.01); *G02B 27/0101* (2013.01); *G06F 3/017* (2013.01); *G07C 5/008* (2013.01); *G09F 21/04* (2013.01); *B60W 2520/10* (2013.01); *B60W 2540/30* (2013.01)

(58) Field of Classification Search
CPC ................... H01L 27/0255; H01L 29/78642; H01L 27/1255; H01L 27/1225; H01L 29/7869; H01L 29/861; H02H 9/044; Y10S 257/91; B60W 50/12; B60W 40/09; B60W 2540/30; B60W 2520/10; G02B 27/01; G02B 27/0101; G09F 21/04; G01C 21/365; B60Q 1/503; B60Q 1/268; G07C 5/008; G06F 3/017

See application file for complete search history.

(56) References Cited

U.S. PATENT DOCUMENTS 7,126,583 B1 * 10/2006 Breed .................... B60K 35/00
345/158
7,202,793 B2 * 4/2007 Grace .................. A61B 5/1103
340/576

(Continued)

FOREIGN PATENT DOCUMENTS

JP 200454065 A * 2/2004

OTHER PUBLICATIONS

Partial European Search Report for App. No. 15176090.7, dated Dec. 14, 2015, 7 pages.

*Primary Examiner* — Rodney Butler
(74) *Attorney, Agent, or Firm* — Christopher G. Darrow; Darrow Mustafa PC

(57) ABSTRACT

A system for a vehicle includes an interactive display subsystem operable to generate output for display on a vehicle window, the output associated with a two-way communication interface for remote communication with a user input subsystem. A method of operating a system for a vehicle includes displaying a two-way communication interface on a vehicle window for remote communication with a user input subsystem.

7 Claims, 21 Drawing Sheets

(56) References Cited

U.S. PATENT DOCUMENTS

| | | | |
|---|---|---|---|
| 8,214,147 B2* | 7/2012 | Cheok | G01S 5/0284 |
| | | | 701/470 |
| 9,024,783 B1* | 5/2015 | Alfaro | B60K 31/185 |
| | | | 340/441 |
| 9,104,537 B1* | 8/2015 | Penilla | G06F 17/00 |
| 2003/0154009 A1 | 8/2003 | Basir et al. | |
| 2004/0021772 A1 | 2/2004 | Mitchell | |
| 2004/0093155 A1 | 5/2004 | Simonds et al. | |
| 2005/0128068 A1 | 6/2005 | Winick et al. | |
| 2005/0154505 A1 | 7/2005 | Nakamura et al. | |
| 2006/0025897 A1* | 2/2006 | Shostak | B60C 23/005 |
| | | | 701/1 |
| 2007/0262640 A1* | 11/2007 | Szczerba | B60T 1/10 |
| | | | 303/113.4 |
| 2008/0174451 A1* | 7/2008 | Harrington | G08B 21/06 |
| | | | 340/905 |
| 2008/0255718 A1 | 10/2008 | Tuff | |
| 2009/0210257 A1* | 8/2009 | Chalfant | G06Q 40/08 |
| | | | 705/4 |
| 2010/0004818 A1 | 1/2010 | Phelan | |
| 2010/0253493 A1 | 10/2010 | Szczerba et al. | |
| 2010/0253918 A1* | 10/2010 | Seder | G01S 13/723 |
| | | | 353/13 |
| 2012/0036038 A1 | 2/2012 | Farmer | G06Q 20/102 |
| | | | 705/26.7 |
| 2012/0089273 A1 | 4/2012 | Seder et al. | |
| 2012/0105370 A1* | 5/2012 | Moore | G06F 3/0412 |
| | | | 345/174 |
| 2012/0112897 A1 | 5/2012 | Oh et al. | |
| 2012/0139760 A1* | 6/2012 | Bevacqua | B60R 25/102 |
| | | | 340/989 |
| 2012/0173067 A1* | 7/2012 | Szczerba | G02B 27/01 |
| | | | 701/23 |
| 2012/0173069 A1 | 7/2012 | Tsimhoni et al. | |
| 2012/0214472 A1 | 8/2012 | Tadayon et al. | |
| 2012/0262673 A1 | 10/2012 | Larsson | |
| 2013/0097664 A1* | 4/2013 | Herz | G06Q 10/10 |
| | | | 726/1 |
| 2014/0070932 A1* | 3/2014 | Prasad | B60Q 1/00 |
| | | | 340/438 |
| 2014/0082108 A1* | 3/2014 | Naamani | H04L 51/04 |
| | | | 709/206 |
| 2014/0091989 A1* | 4/2014 | Szczerba | G01S 13/723 |
| | | | 345/7 |
| 2014/0097968 A1* | 4/2014 | Kamiya | G02B 27/01 |
| | | | 340/905 |
| 2014/0114502 A1* | 4/2014 | Hugron | B60W 50/14 |
| | | | 701/2 |
| 2014/0307324 A1* | 10/2014 | Cho | G02B 27/01 |
| | | | 359/631 |
| 2014/0310739 A1* | 10/2014 | Ricci | G07C 9/00158 |
| | | | 725/28 |
| 2014/0368535 A1* | 12/2014 | Salter | G02B 27/017 |
| | | | 345/619 |
| 2015/0235540 A1* | 8/2015 | Verna | H04W 4/12 |
| | | | 340/539.11 |
| 2015/0244826 A1* | 8/2015 | Stenneth | H04Q 9/00 |
| | | | 709/213 |

\* cited by examiner

METHOD FOR REMOTE COMMUNICATION WITH AND THROUGH A VEHICLE

BACKGROUND

The present disclosure relates to systems and methods for communication with a vehicle.

With increasing numbers of young and elderly drivers, questionable driving practices have increased accordingly. Particular questionable driving practices that have been researched include lack of driving experience, inadequate driving skills, risk-taking behavior, poor judgment, delayed decision making, and distraction. People remote from the vehicle, such as a parent or loved one, may find it useful to be able to monitor the driving practices of the driver and/or the situation around the vehicle, and then communicate with the driver or control vehicle functionalities to facilitate safe driving.

Moreover, as automated vehicles become more sophisticated, unoccupied vehicles that utilize the same road system as conventional vehicles will become more common. Persons encountering the unmanned vehicle may wish to communicate with the owner of the vehicle. For example, if unmanned vehicle is involved in an accident or otherwise disabled, it may be useful for people encountering the unmanned vehicle to communicate with the vehicle's owner or another person associated with the vehicle.

SUMMARY

The system and method for a vehicle described herein provides an interactive remote communication page as a two-way communication interface for voice, video, and/or multimedia communication for a vehicle operating in an unmanned autonomous vehicle mode. The interactive remote communication page provides a communication interface between a remote user and on-scene personnel encountering the vehicle via a vehicle window. The system and method can allow a remote user to view the situation in and/or around the vehicle and communicate with on-scene personnel. In an alternative non-limiting embodiment of a manned vehicle, the system can monitor the driver, the driving of the vehicle, or a situation around the vehicle, and allow a person remote from the vehicle to communicate with the occupants of the vehicle and/or control vehicle functionalities to facilitate safe driving in a manned vehicle mode.

A system for a vehicle according to one disclosed non-limiting embodiment of the present disclosure includes an interactive display subsystem operable to generate output for display on a vehicle window, the output associated with a two-way communication interface for remote communication with a user input subsystem.

A system for a vehicle according to another disclosed non-limiting embodiment of the present disclosure includes a control subsystem; an automated self-drive system in communication with the control subsystem; an interactive remote communication subsystem in communication with the control subsystem; and an interactive display subsystem in communication with the interactive remote communication subsystem, the interactive display subsystem operable to generate output for display on a vehicle window, the output associated with a two-way communication interface for remote communication with a user input subsystem.

A method for remote monitoring of a vehicle according to one disclosed non-limiting embodiment includes identifying a questionable driving practice with respect to the vehicle and alerting an off board personal electronic device as to the questionable driving practice.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

An interactive remote communication subsystem for a vehicle is disclosed. The interactive remote communication subsystem displays an interactive remote communication page as a two-way communication interface for a vehicle operating in an unmanned autonomous vehicle mode. The interactive remote communication subsystem provides for real time interaction with a user input subsystem to communication between a user and on-scene personnel should the vehicle be operated via an automated self-drive system. The interactive remote communication subsystem further includes sensors that allow for a remote user to view the situation in and/or around the vehicle with options to monitor and/or lock vehicle systems to facilitate safe driving should particular driving conditions be identified for a vehicle operating in a manned vehicle mode. The particular driving condition may be a questionable driving practice identified by speeding, weaving or other maneuver.

Figure 1:
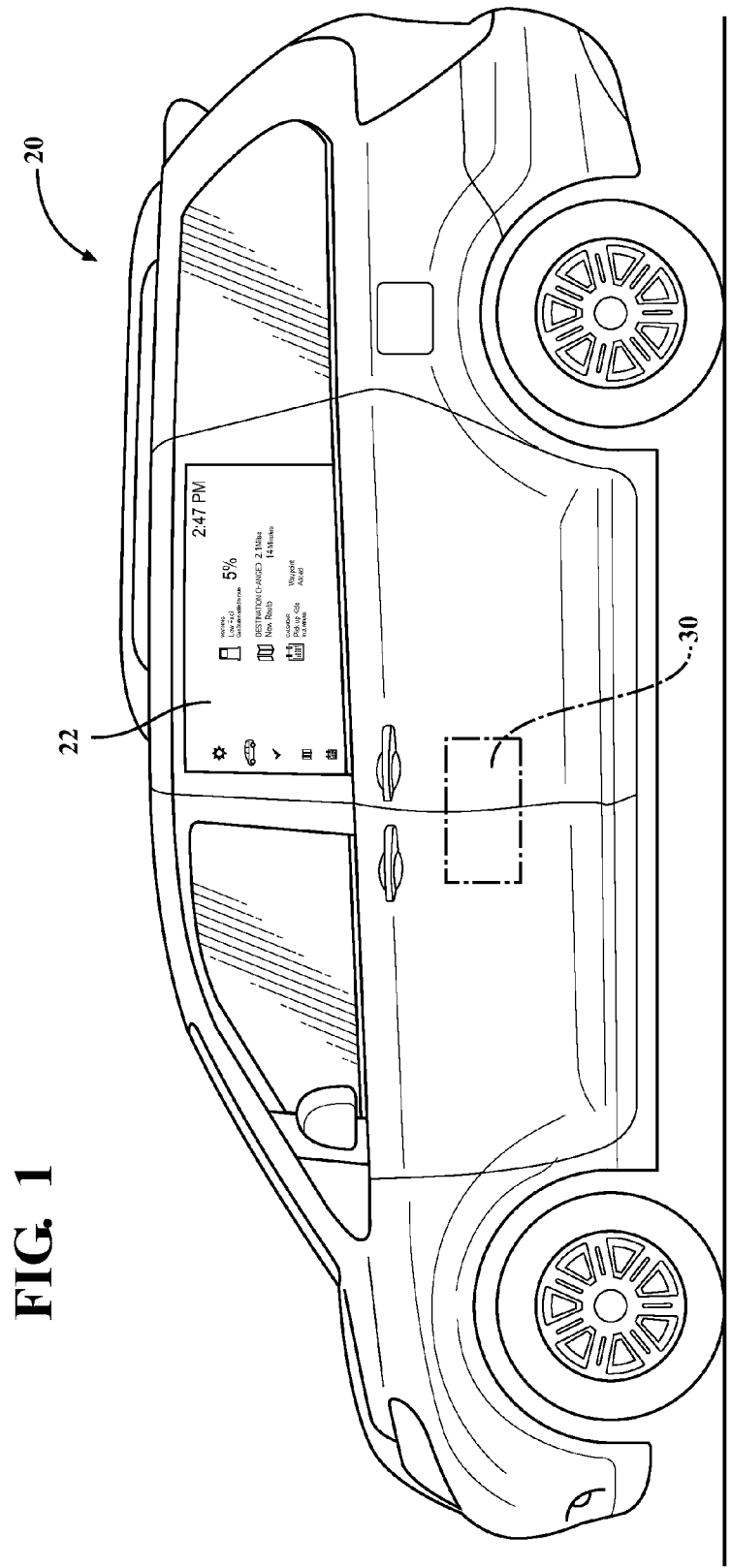
FIG. 1 is a pictorial representation of an example vehicle for use with an interactive vehicle window display system.

FIG. 1 schematically illustrates a vehicle 20 with a window 22 and an interactive vehicle window display system 30. Although the window 22 is here shown as a driver's side passenger window of a minivan type vehicle in the disclosed, non-limiting embodiment, it should be appreciated that various vehicle types to include both occupied and unoccupied full automation self-drive vehicles will also benefit herefrom.

Figure 2:
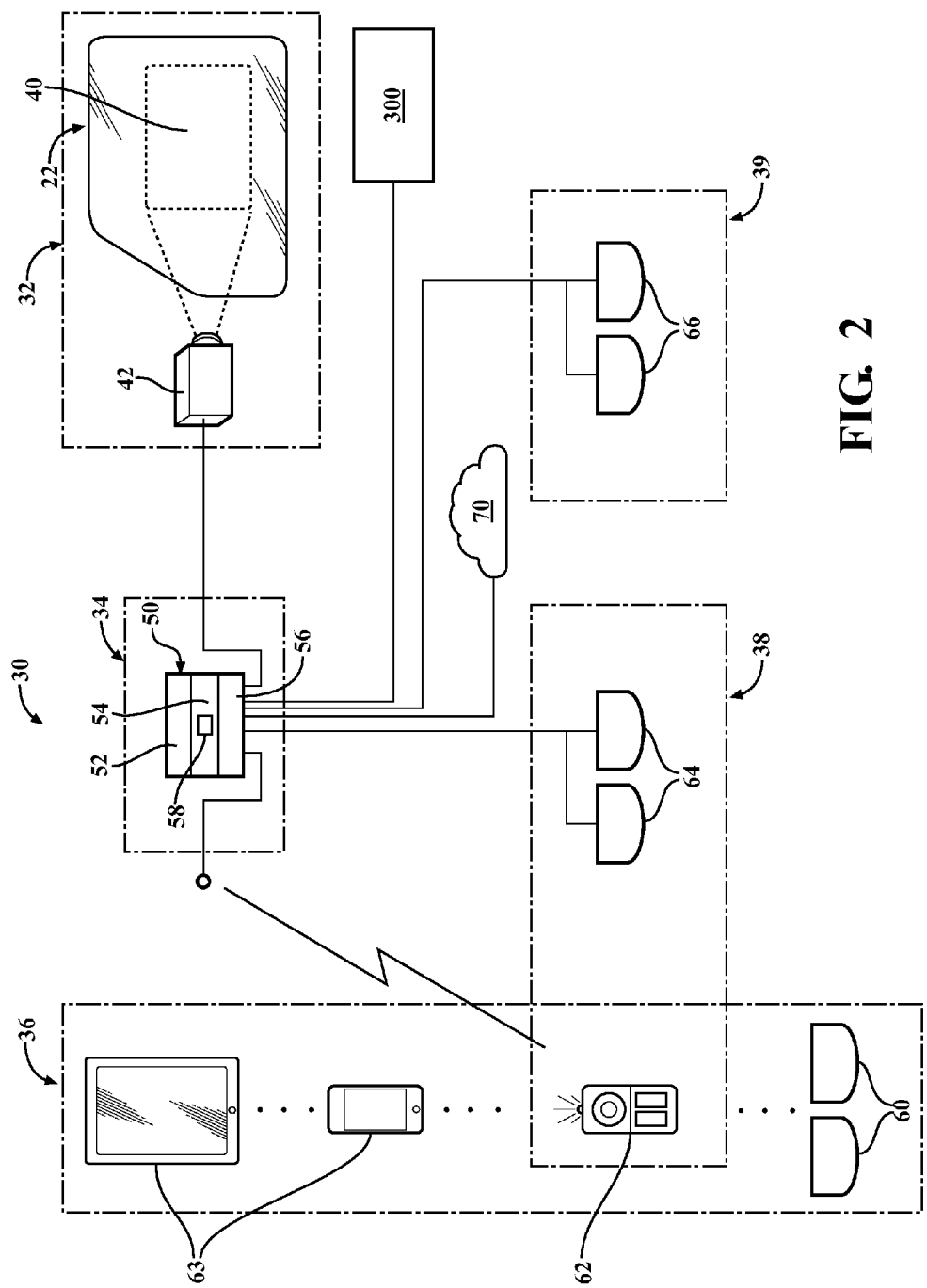
FIG. 2 is a schematic block diagram of the interactive vehicle window display system according to one non-limiting embodiment.

With reference to FIG. 2, selected portions of the system 30 are schematically illustrated. The system 30 generally includes an interactive display subsystem 32, a control subsystem 34, a user input subsystem 36, a user identification subsystem 38, and a user location subsystem 39. It should be appreciated that although particular subsystems are separately defined, each or any of the subsystems may be combined or segregated via hardware and/or software of the system 30. Additionally, each or any of the subsystems can be implemented using one or more computing devices including conventional central processing units or other devices capable of manipulating or processing information.

The interactive display subsystem 32 can include any device or devices capable of displaying images on a vehicle window 22 under the control of system 30, and can be adapted for viewing from outside the vehicle, inside the vehicle, or both. In one non-limiting example the interactive display subsystem 32 can include a display device integral to the window 22, such as an LCD. Such a display can be illuminated by ambient light or by one or more light sources under the control of system 30. Such light sources can be mounted at any operable locations enabling light emission onto a window from inside or outside the vehicle, depending on whether the display is to be viewed by a user located outside or inside the vehicle. Examples of such mounting locations can include in the floor, in the vehicle headliner, within the vehicle door structure, or in the exterior door panel.

Figure 3:
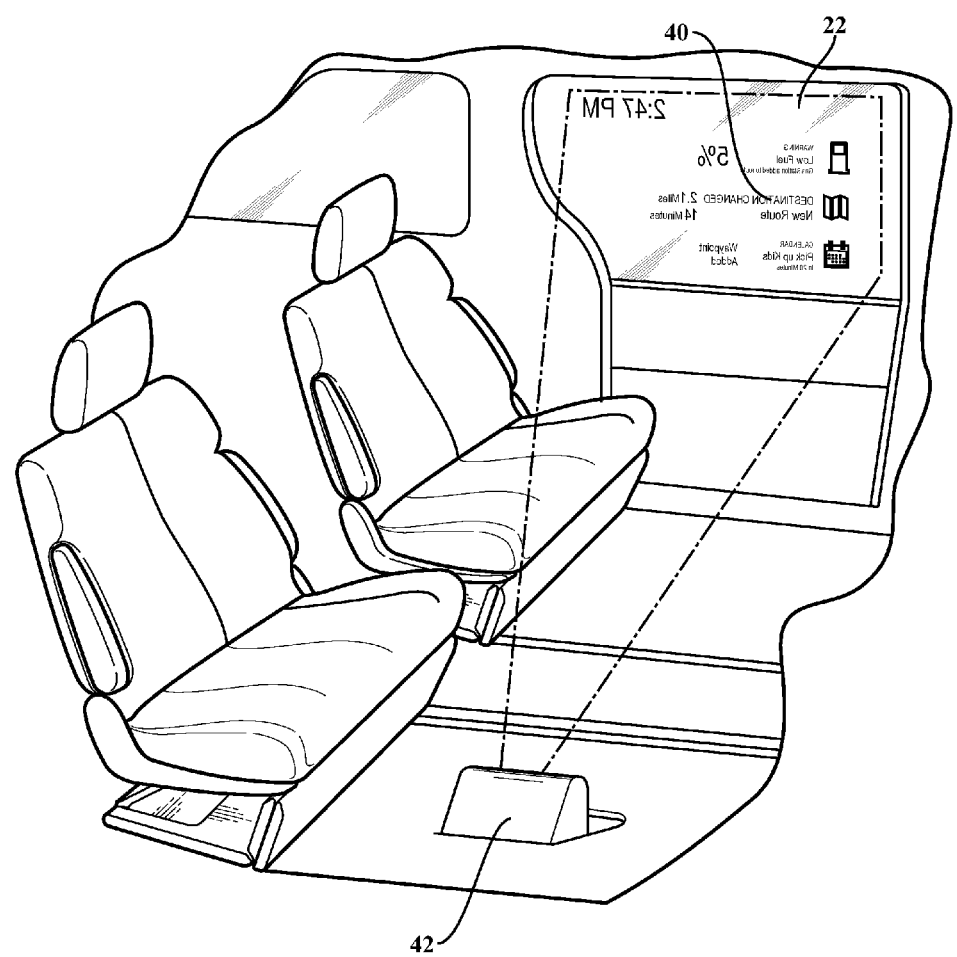
FIG. 3 is a partial interior view of the vehicle with the interactive vehicle window display system.

In another non-limiting example, the interactive display subsystem 32 can include a coating 40 and a projector 42. The coating 40, for example, may be a polymer dispersed liquid crystal (PDLC) film, applied to the window 22 to provide both transparency when inactive and partial or complete opacity when active. The window 22 treated with the coating 40 is thereby operable to display content as a projection page visible from outside and/or inside the vehicle 20 (FIG. 1). The projector 42 can be mounted in the floor (FIG. 3) or other locations within the vehicle 20, such as the vehicle headliner or within the vehicle door structure as well as in locations on the vehicle exterior such as in an exterior door panel. The illustrated shaded area extending from the projector 42 toward the window 22 schematically represents the projection of output in the form of content pages provided by the projector 42. In response to the approach of a recognized user, the coating 40 changes from transparent to opaque so that the projector 42 may project the output onto the window 22.

As will be further described, the displayed content can include personalized information or entertainment content such as videos, games, maps, navigation, vehicle diagnostics, calendar information, weather information, vehicle climate controls, vehicle entertainment controls, email, internet browsing, or any other interactive applications associated with the recognized user, whether the information originates onboard and/or off board the vehicle 20.

The control subsystem 34 generally includes a control module 50 with a processor 52, a memory 54, and an interface 56. The processor 52 may be any type of microprocessor having desired performance characteristics. The memory 54 may include any type of computer readable medium that stores the data and control algorithms described herein such as a user support system algorithm 58. The functions of the algorithm 58 are disclosed in terms of functional block diagrams (FIG. 6) and representative pages (FIGS. 9-14), and it should be understood by those skilled in the art with the benefit of this disclosure that these functions may be enacted in either dedicated hardware circuitry or programmed software routines capable of execution in a microprocessor based electronics control embodiment.

With continued reference to FIG. 2, the control module 50 may be a portion of a central vehicle control, a stand-alone unit, or other system such as a cloud-based system. Other operational software for the processor 52 may also be stored in the memory 54. The interface 56 facilitates communication with other subsystems such as the interactive display subsystem 32, the user input subsystem 36, the user identification subsystem 38, and the user location subsystem 39. It should be understood that the interface 56 may also communicate with other onboard vehicle systems and offboard vehicle systems. Onboard systems include but are not limited to, a vehicle head unit 300 which communicates with vehicle sensors that provide, for example, vehicle tire pressure, fuel level and other vehicle diagnostic information. Offboard vehicle systems can provide information that includes but is not limited to, weather reports, traffic, and other information that may be provided via cloud 70.

The user input subsystem 36 can include one or more input sensors including onboard input sensors 60, offboard input devices, or both. Onboard input sensors 60 can include one or more motion cameras or other light sensors configured to detect gesture commands, one or more touch sensors configured to detect touch commands, one or more microphones configured to detect voice commands, or other onboard devices configured to detect user input. The user input subsystem can also include offboard input devices such as a key fob 62 and/or a personal electronic device 63 of the user, e.g. a tablet, smart phone, or other mobile device.

In some instances, at least one onboard input sensor 60 or offboard input device can be integrated into, or operate in conjunction with, the interactive display subsystem 32. In one non-limiting example, the interactive display subsystem 32 includes an LCD display integrated into a window 22 and can operate in conjunction with one or more touch sensors integrated into the window 22, causing the window to function as a touchscreen. In another non-limiting example, the interactive display subsystem 32 includes a projector 42 and coating 40 on the window 22 and can operate in conjunction with one or more motion detectors configured to detect user gesture commands, causing the window to operate as a gesture-based interactive display. Subsystem combinations involving the interactive display subsystem 32 and the user input subsystem and enabling user interaction with a display on a vehicle window 22 will be referred to herein as an interactive window display.

Figure 4:
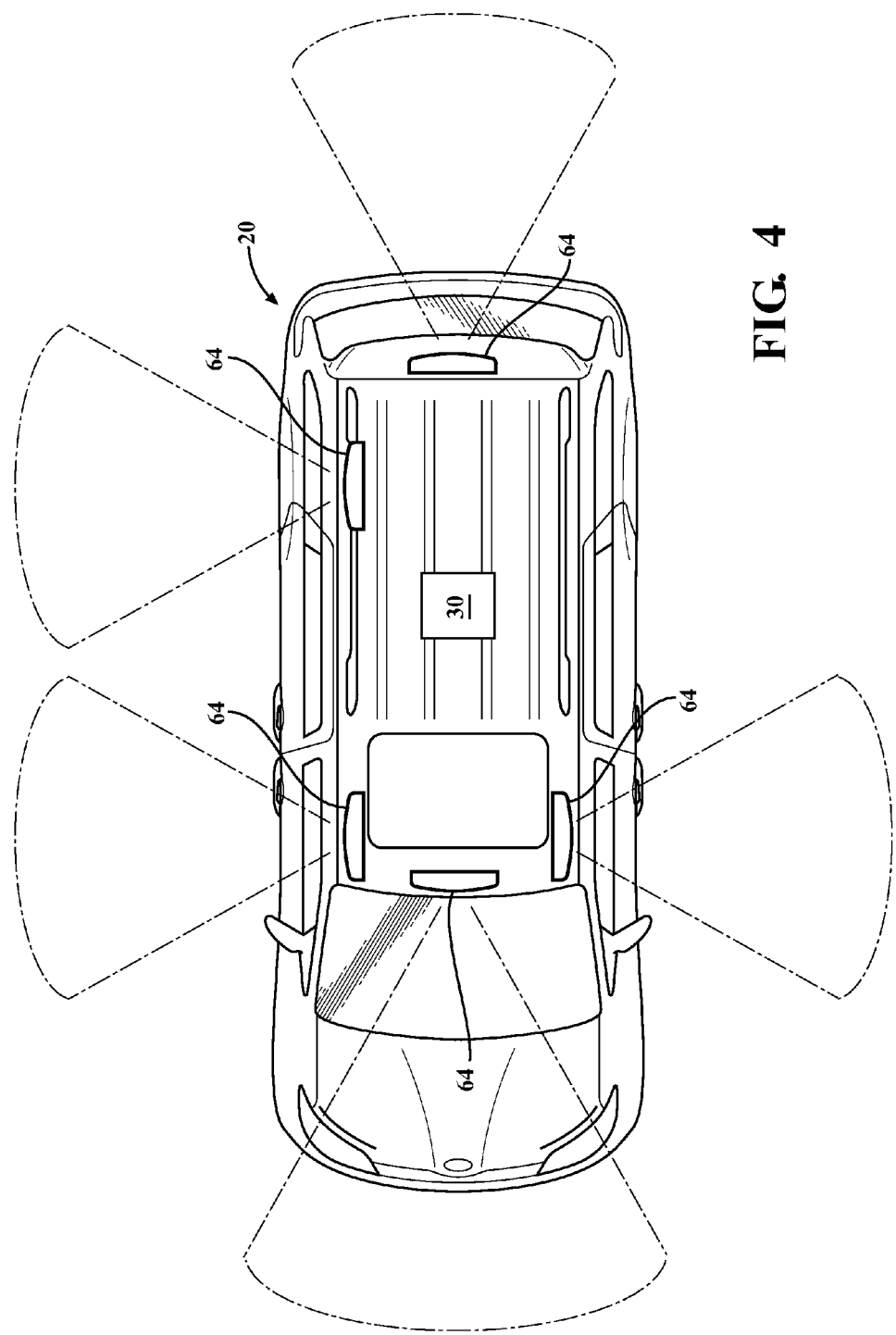
FIG. 4 is a top view of the vehicle illustrating an exterior user identification subsystem of the interactive vehicle window display system.
Figure 5:
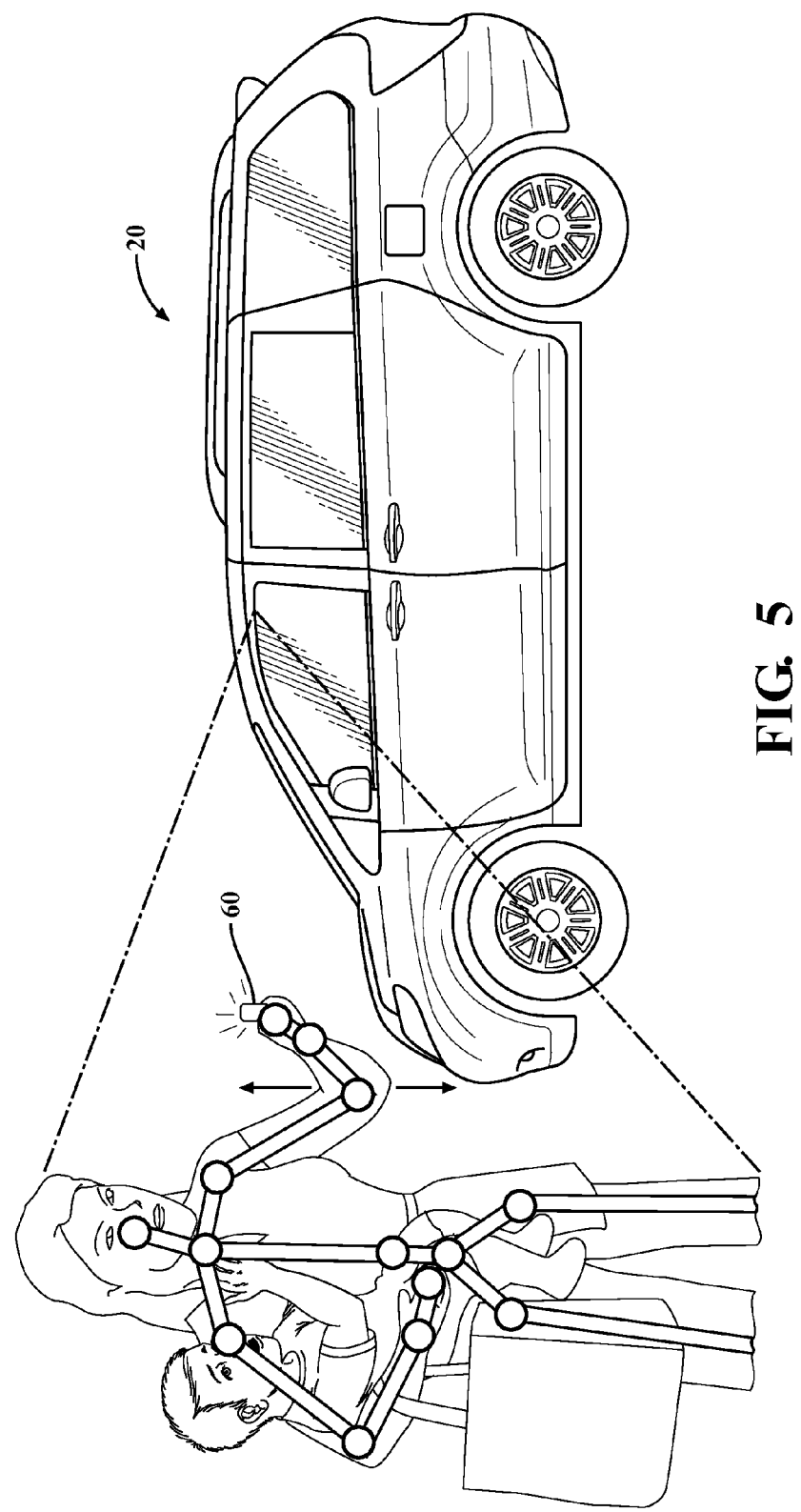
FIG. 5 is a pictorial representation of the vehicle illustrating user identification via a skeletal joint relationship, key fob and/or user gesture.

The user identification subsystem 38 includes one or more identification sensors 64 such as a closed-circuit television (CCTV) camera, charge coupled device (CCD), Complementary Metal Oxide Semiconductor (CMOS) cameras/imagers, infrared, thermal or other sensor mounted to the vehicle 20 to provide a desired field of view external to the vehicle 20 as shown in FIG. 4, internal to the vehicle, or both. One example user identification subsystem 38 can recognize the driver and/or passenger based on image data captured by identification sensors 64, e.g. a skeletal joint relationship 66 and/or other user form data (FIG. 5), separate from, or along with, wireless devices such as the key fob 62 associated with that particular driver and/or passenger. Based at least in part on this identification, the system 30 provides access to interactive interfaces on the interactive display subsystem 32 associated with the particular driver and/or passenger.

The system 30 can store user profiles of known users, the user profiles including identification information relevant to individual users. For example, a user profile can contain skeleton joint relationship data or facial recognition data useable by the user identification subsystem 38 to identify or authenticate a user. A user profile can additionally contain personal interest information, such as personal calendar and event information, driving/destination history, web browsing history, entertainment preferences, climate preferences, etc. In some variations, any or all information contained in a user profile can be stored on or shared with a personal electronic device 63, remote server, or other cloud 70 based system. Such offboard storage or sharing of user profile data can facilitate utilization of user profile data in other vehicles such as any additional vehicles owned by the user, rental vehicles, etc. Such user profile data can be secured by being accessible through a password protected application running on the cloud 70 based system, by biometric authentication, or by other effective means.

In some instances, a user profile can additionally contain user access information; data pertaining to whether the user is allowed to control a given vehicle function. For example, the user profile associated with a user can indicate full user access, or function control rights for that user. This can be analogous to the control rights of the administrator of a personal computer. A user profile can alternatively indicate restricted user access. For example, the user profile associated with a child can be set to block the user from accessing certain audio or video controls, the navigation system, altering user profiles, or the like.

Registration of various user profiles with the system 30 can be completed in any manner, for example, over the internet or with a direct vehicle interface. User profiles can be based on the identities of individual users known to or registered with the system, or to user categories, such as "unknown user", or "valet". In different variations, a default user category such as "unknown user" or "valet" can be associated with limited, default access, or can be associated with no access, i.e. complete prohibition of access to the system 30.

The user location subsystem 39, operable to determine the location of one or more users inside or outside the vehicle, includes one or more location sensors 66 such as a pressure sensor, temperature sensor, or camera deployed inside or outside the vehicle. In some cases, a device can serve as both an identification sensor 64 and a location sensor 66. For example, a camera mounted within the vehicle can provide information on a user's specific identity, by means described above, and on the user's location within the vehicle, such as the driver's seat or the front-row passenger's seat. In some cases, elements of the interactive display subsystem 32 can also operate as location sensors 66 within the user location subsystem 39. For example, pressure sensors within a smart-screen or motion detectors operating as part of an interactive display can be used to obtain user location information.

In some instances, user access can be based on user location as determined by the user location subsystem 39. For example, second or third row passengers can be allowed or disallowed access to various vehicle functions such as the navigation system. Optionally, a user with a user profile that is associated with unlimited access per the access information associated with the user profile can specify such settings. In some instances, user access can be based on a combination of the user profile as applied by the user identification subsystem 38, and the user location as detected by the user location subsystem 39. For example, a user with unlimited access as specified by the applied user profile can nonetheless be blocked from accessing certain vehicle functions when occupying the driver's seat of a moving vehicle.

Figure 6:
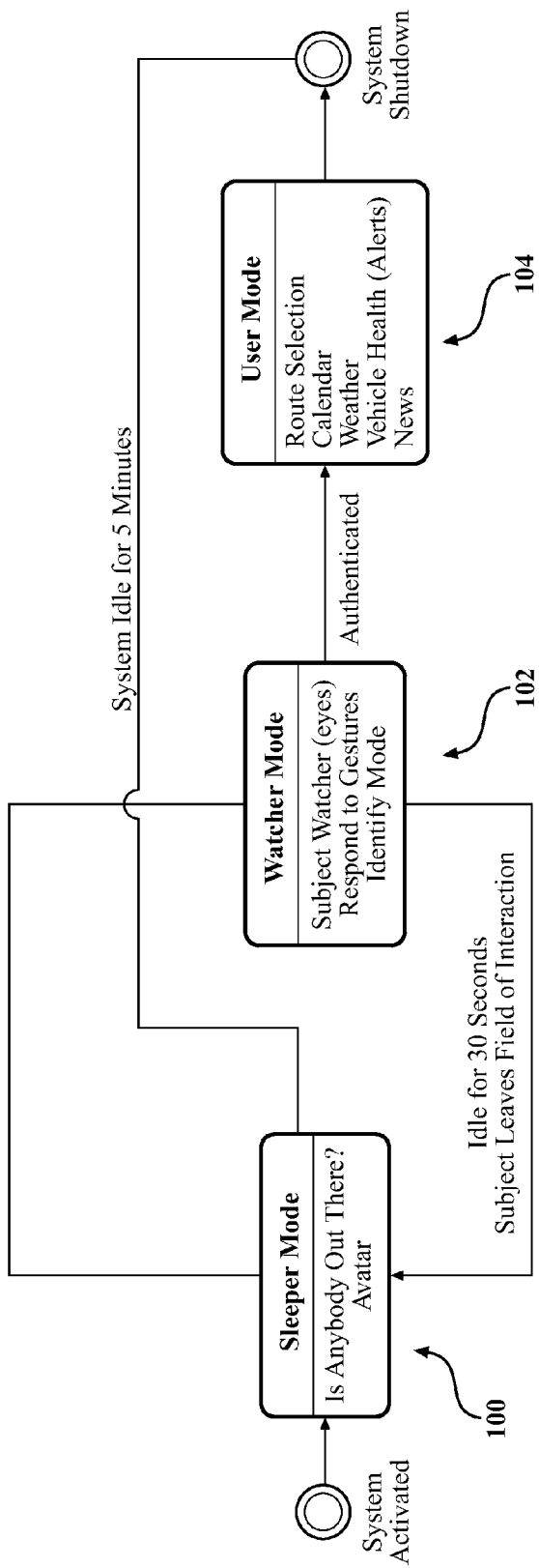
FIG. 6 is a schematic block diagram of an algorithm for operation of the system according to one non-limiting embodiment.

With reference to FIG. 6, operation of the system 30 according to one disclosed non-limiting embodiment generally includes a sleeper mode 100, a watcher mode 102 and a user mode 104. It should be appreciated that other modes may additionally or alternatively be provided.

If the system 30 is active but has yet to detect a user, the system 30 will be in sleeper mode 100 until awakened by the user identification subsystem 38. After detection but prior to identification by the system 30, the watcher mode 102 may be utilized to interact with authenticated as well as un-authenticated persons. For example, when a person approaches the vehicle 20, the system 30 recognizes the direction from which the person has approached then activates the interactive display subsystem 32 to display an avatar, eyes or other graphic. The graphic may be directed specifically toward the direction from which the person approaches, e.g., the graphical eyes "look" toward their approach. Alternatively, an audio capability allows the system 30 to respond to commands and initiate interaction from a blind side of the vehicle 20, i.e., a side without the interactive display subsystem 32. The watcher mode 102 utilizes the user identification subsystem 38 to discriminate between authenticated and un-authenticated persons.

The user mode 104 allows a user with a known operator and/or passenger user profile in the system 30 to make decisions on approach to the vehicle 20 so that so that certain vehicle interactions need not await entry into the vehicle 20. The user mode 104 reduces distractions through the reduction of travel-associated decisions from the driver's cognitive, visual and manual workload streams once within the vehicle 20. In furtherance of this, the user is presented with an overview of information to include, for example, weather, traffic, calendar events and vehicle health. As will be further described, predictive functions of the system 30 identify likely actions, and offer optimal paths to completion, such as planning an efficient route.

A maximum range of content provision by the interactive display subsystem 32 may be associated with a maximum distance at which that content can be effectively interacted with by the user. In one disclosed non-limiting embodiment, the maximum range of each content feature is prioritized with respect to legibility range of content displayed by the interactive display subsystem 32. This range metric facilitates the determination of the order in which content appears in the walkup experience. Access to prioritized content with greater maximum range allows the walkup experience to begin further from the vehicle 20 to provide the user with more overall time to interact with the system 30.

In one disclosed non-limiting embodiment, the system 30 utilizes a multi-factor authentication for security and authorization. Example multi-factor authentication may include the key fob 62, skeleton joint relationship recognition (FIG. 5), and/or a gesture password (FIG. 8). The user may be provisionally identified with one of these factors, but may require a total of at least two factors to authenticate the user prior to display of certain content. That is, the user will not be granted access to all the features in user mode 104 until a multi-factor authentication is passed and the user is within a predetermine range of the vehicle 20. This authentication process ensures the security of the vehicle and the personal information embedded in the system 30. In one disclosed non-limiting embodiment, the first authentication factor is the key fob 62 and the second is the skeleton joint relationship (FIG. 7) of the user. If the user does not have their key fob 62, the skeleton joint relationship may become the first authentication factor and a gesture password such as a wave or particular arm movement (FIG. 8) becomes the second.

The key fob 62 in one disclosed non-limiting embodiment may be encrypted to uniquely identify each user to the system 30. Additional security protocols such as a rolling time key to ensure that even the encrypted key cannot be intercepted and re-used by unauthorized devices may additionally be utilized.

Once the key fob 62 is recognized, the user will be welcomed and pre-authenticated to allow limited access to selected content in the user mode 104. This will provide the user with enough time to cycle through multiple content features during the walkup experience, yet maintain security with respect to other content features e.g., a destination. Once the user has been fully authenticated, all content features, e.g. destination made during the pre-authenticated state, are validated for display. If the authentication fails, the user will not be granted access to the vehicle 20 or any sensitive information. The system 30 in this disclosed non-limiting embodiment allows pre-authenticated access at about 30-40 feet and full access at about 15-25 feet from the vehicle.

Figure 7:
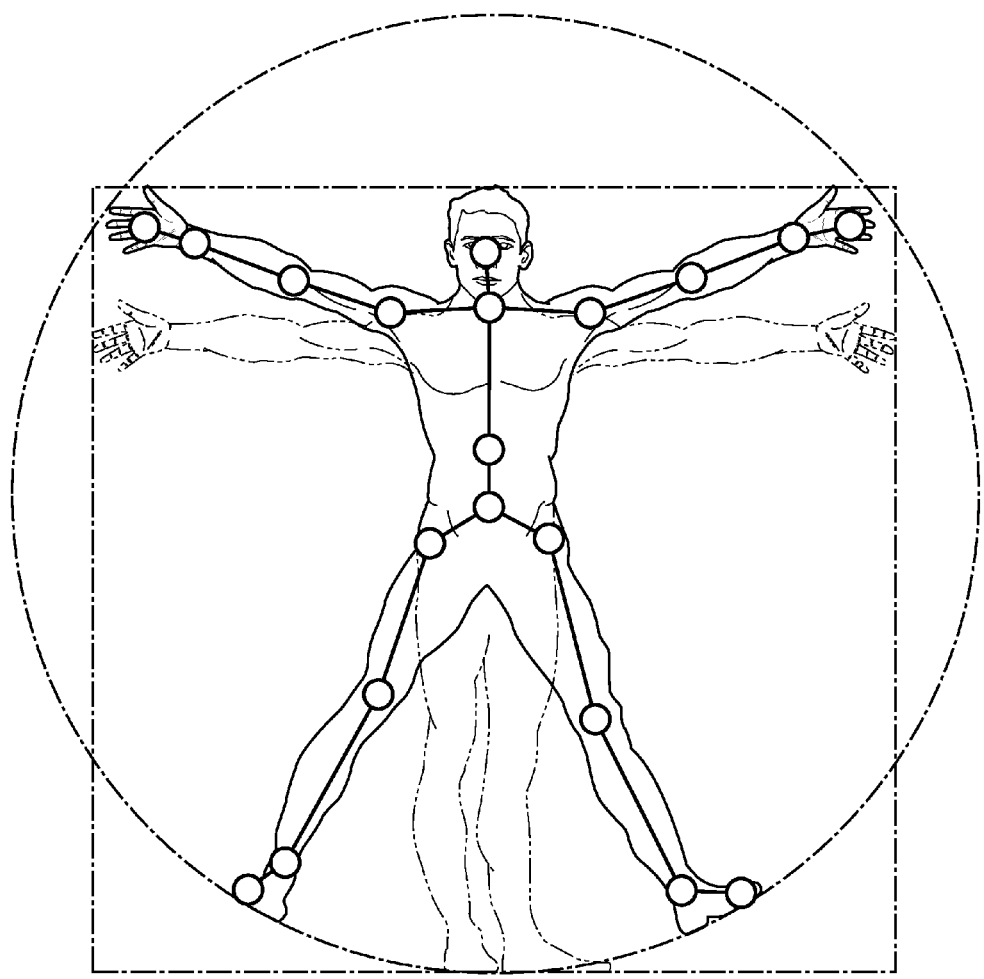
FIG. 7 is a pictorial representation of an example skeletal joint relationship recognizable by the system.
Figure 8:
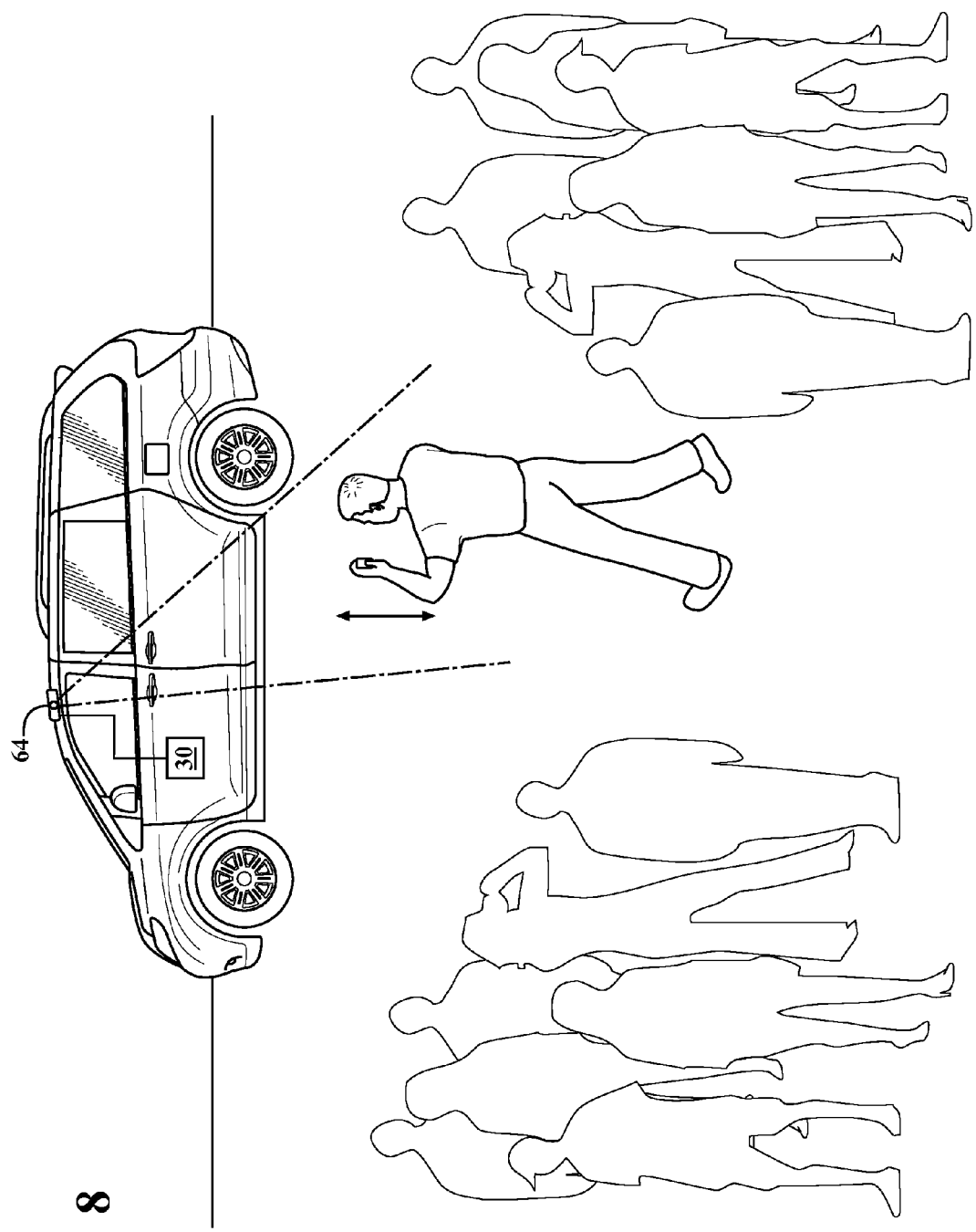
FIG. 8 is an illustration of an example user gesture recognizable by the system.

With respect to FIG. 7, to provide further authentication, the system 30 is operable to recognize a user by his skeleton joint relationships. Skeleton joint relationships in this disclosed non-limiting embodiment facilitate pre-authentication but not full authentication that grants full access to the vehicle 20. However, if the user has been pre-authenticated via the key fob 62, a matching skeleton joint relationship will fully authenticate the user. That is, the user identification subsystem 38 may utilize skeleton joint relationships as the second point of identification.

Figure 9:
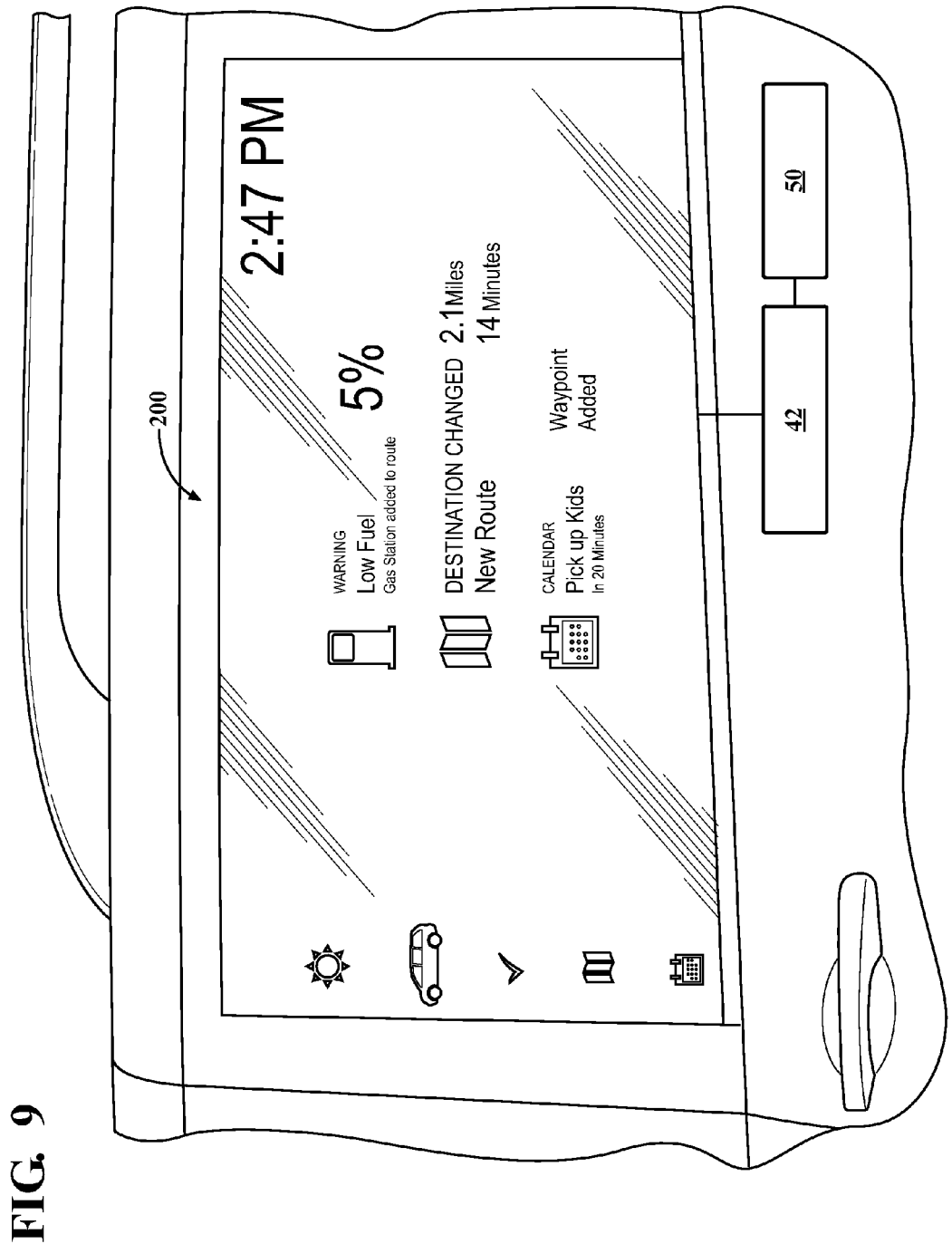
FIG. 9 is an example landing page displayed by the interactive vehicle window display system.

With reference to FIG. 9, once authenticated, the "landing" or "home" page 200 provides a summary of alerts and important information to the user. The landing page 200 provides the user with a readily reviewable overview of the status of the vehicle and how it may affect his schedule and activities. In this example, the content includes time information, vehicle diagnostic information, and personal calendar information. Here shown, a low fuel warning is provided in addition to a traffic-based route update for use by the vehicle navigation system and a calendar event reminder to "Pick up Kids in 20 minutes." In another example, the system 30 will include a fuel station as a stop during route guidance if the destination is a distance greater than the available fuel range. Notably, preferred fuel stations or other stops may be predefined in the user profile.

The landing page 200 further displays a plurality of icons to indicate additional content pages that can be viewed by the authorized user. The landing page 200 itself may be accessed on each content page as an icon such as a vehicle manufacturer mark icon on each content page. The landing page 200 allows the authorized user to understand what vehicle systems or personal user profile items may require further attention and provides access to additional content feature details with regard to these items in the form of navigable icons that lead to additional content pages. The landing page 200 can additionally or alternatively integrate an interactive display, for example, a smart page or video game. Other interactive vehicle display page configurations are also possible.

Selection of content is accomplished with, for example, the key fob 62, user gestures, voice commands, touch inputs, etc. In one example, the user utilizes the key fob 62 to cycle through various pages displayed by the interactive display subsystem 32. In one example, the key fob 62 may include a four button directional pad and two auxiliary buttons. Alternatively, hand gestures may be used to "swipe" between pages. It should be appreciated that although particular pages are illustrated in the disclosed non-limiting embodiment, various alternative or additional pages may be provided.

Figure 10:
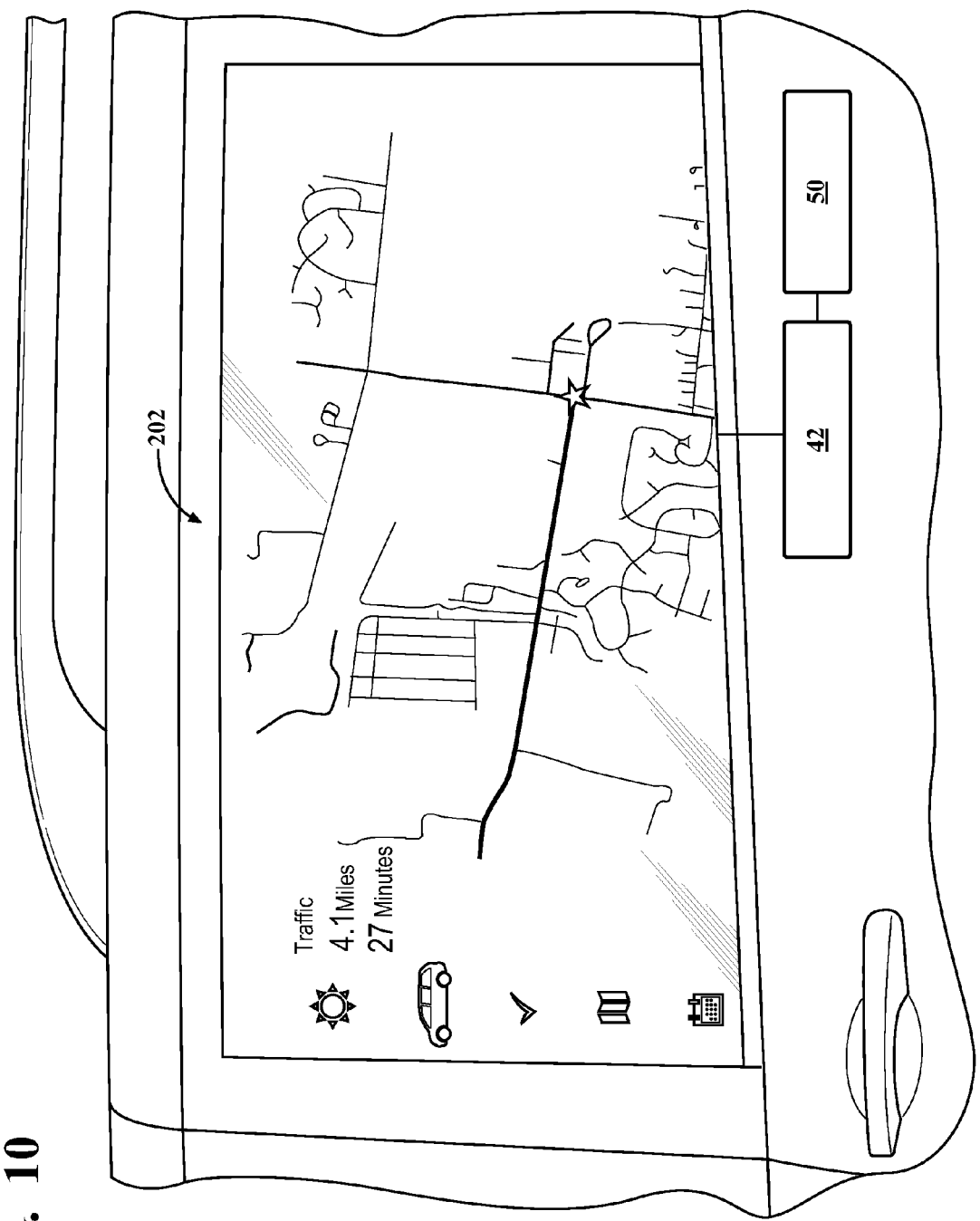
FIG. 10 is an example route page displayed by the interactive vehicle window display system.

With reference to FIG. 10, a route page 202 defaults to the predicted best route for the user with respect to an explicit or inferred next destination. Any alternate destinations or routes that can be explicit or inferred with confidence from, for example, a user personal electronic device, are presented to permit user selection by scrolling through the options. The suggested route screen is here shown accessed using the folded-map icon, however, other icons may be utilized.

Figure 11:
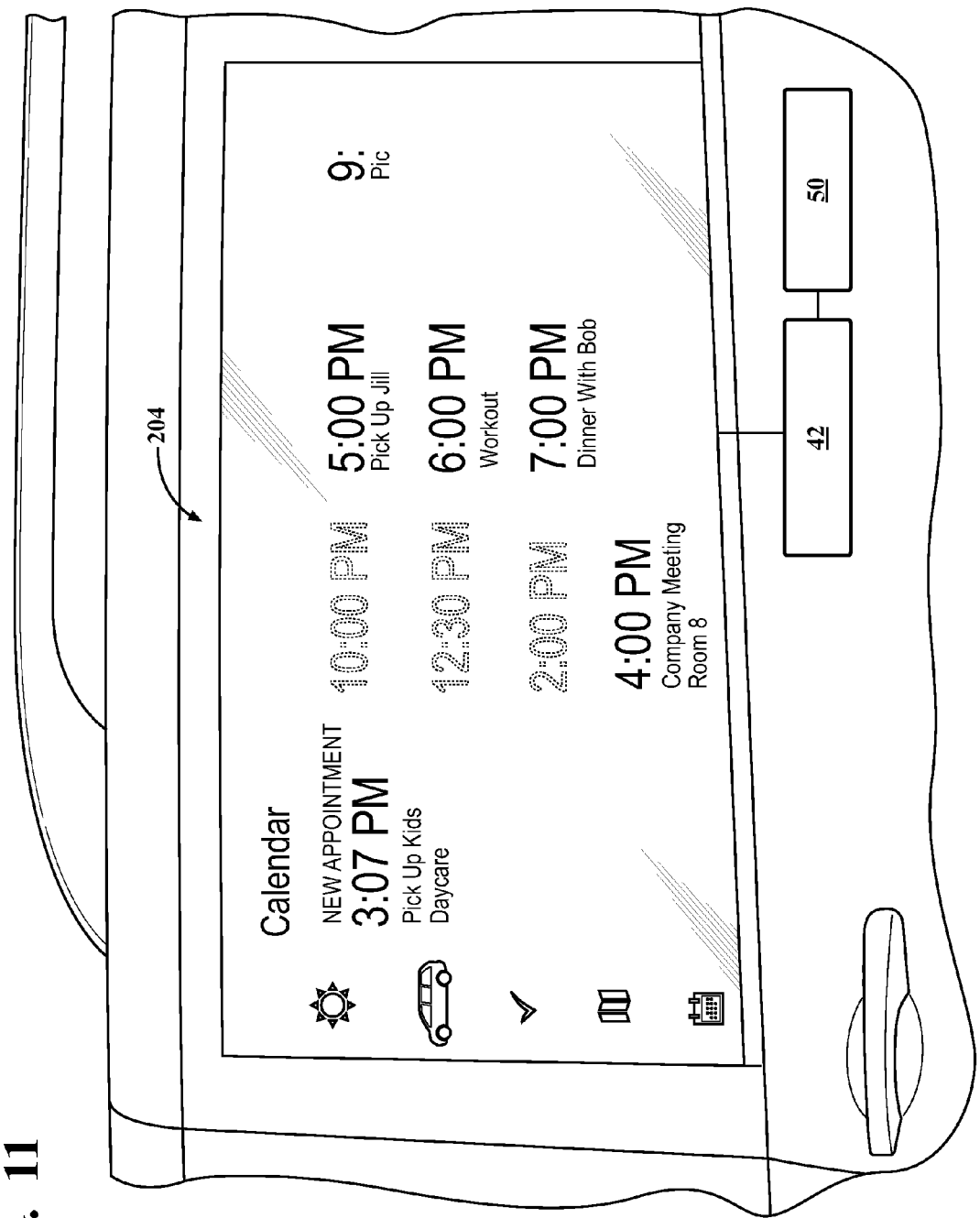
FIG. 11 is an example calendar page displayed by the interactive vehicle window display system.

With reference to FIG. 11, a calendar page 204 displays the user's calendar. In this example, the view is near-term, and shows only the next 2-3 upcoming appointments. If the event includes location information the user is also given the option to use the event for destination selection. Here shown, the calendar page 204 provides content with respect to the next appointment highlighted for the user and provides a reminder to "Pick Up Kids." The calendar screen is here shown accessed using a flip calendar icon, however, other icons may be utilized.

Figure 12:
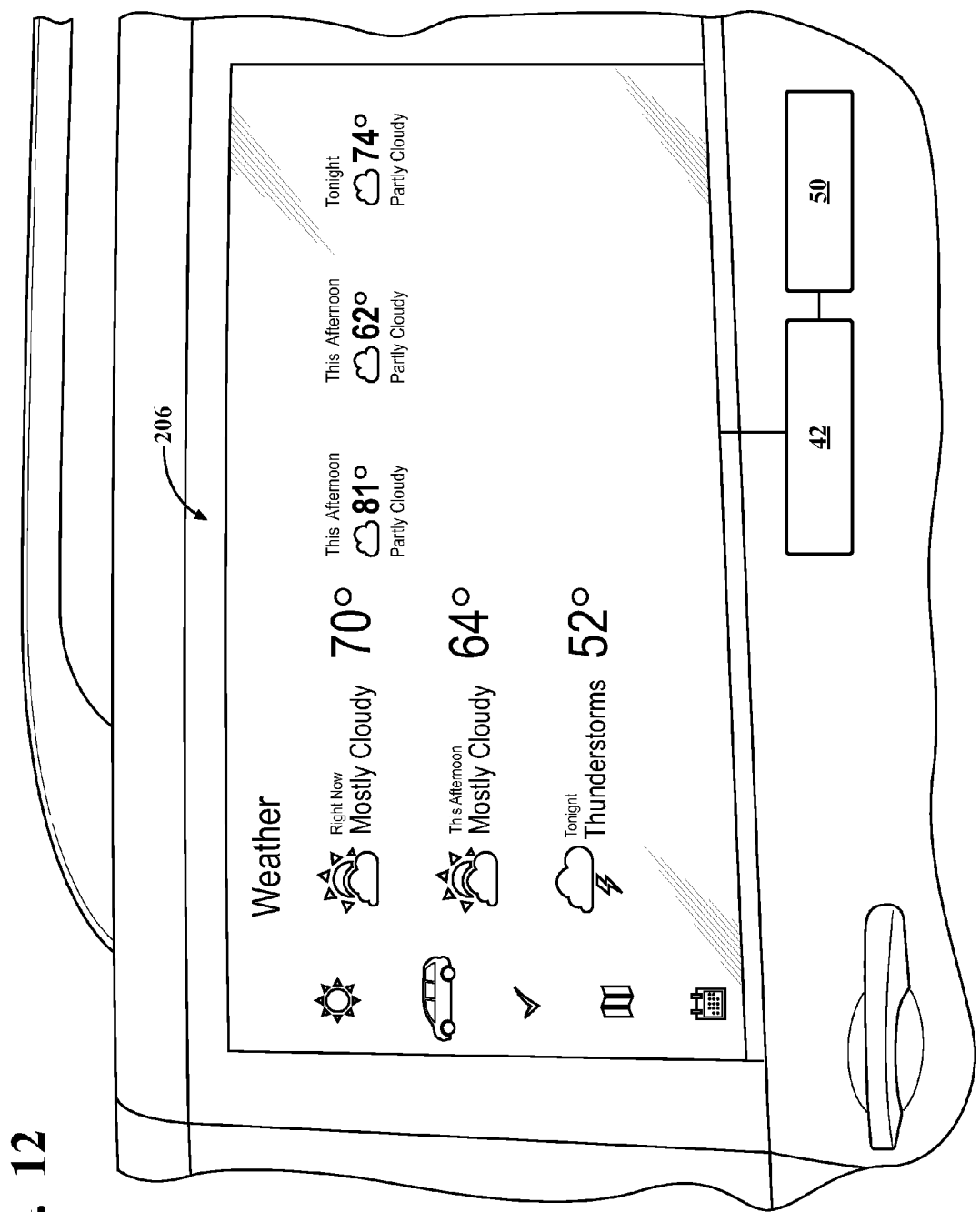
FIG. 12 is an example weather page displayed by the interactive vehicle window display system.

With reference to FIG. 12, a weather page 206 leverages information about the route to provide relevant weather information—this may be especially effective when the user is travelling away from home. For example, the system 30 determines whether it is more valuable to present the user with local weather information, destination weather information, or both, depending on the settings selected by the user or the type of weather information available. Here shown, the weather forecast is chronological. The weather page 206 can be accessed with a sun icon, however, other icons may be utilized. In addition, weather conditions can be utilized to generate a reminder for display on the landing screen 200 that, for example, suggests an umbrella be placed in the vehicle if rain is forecasted.

Figure 13:
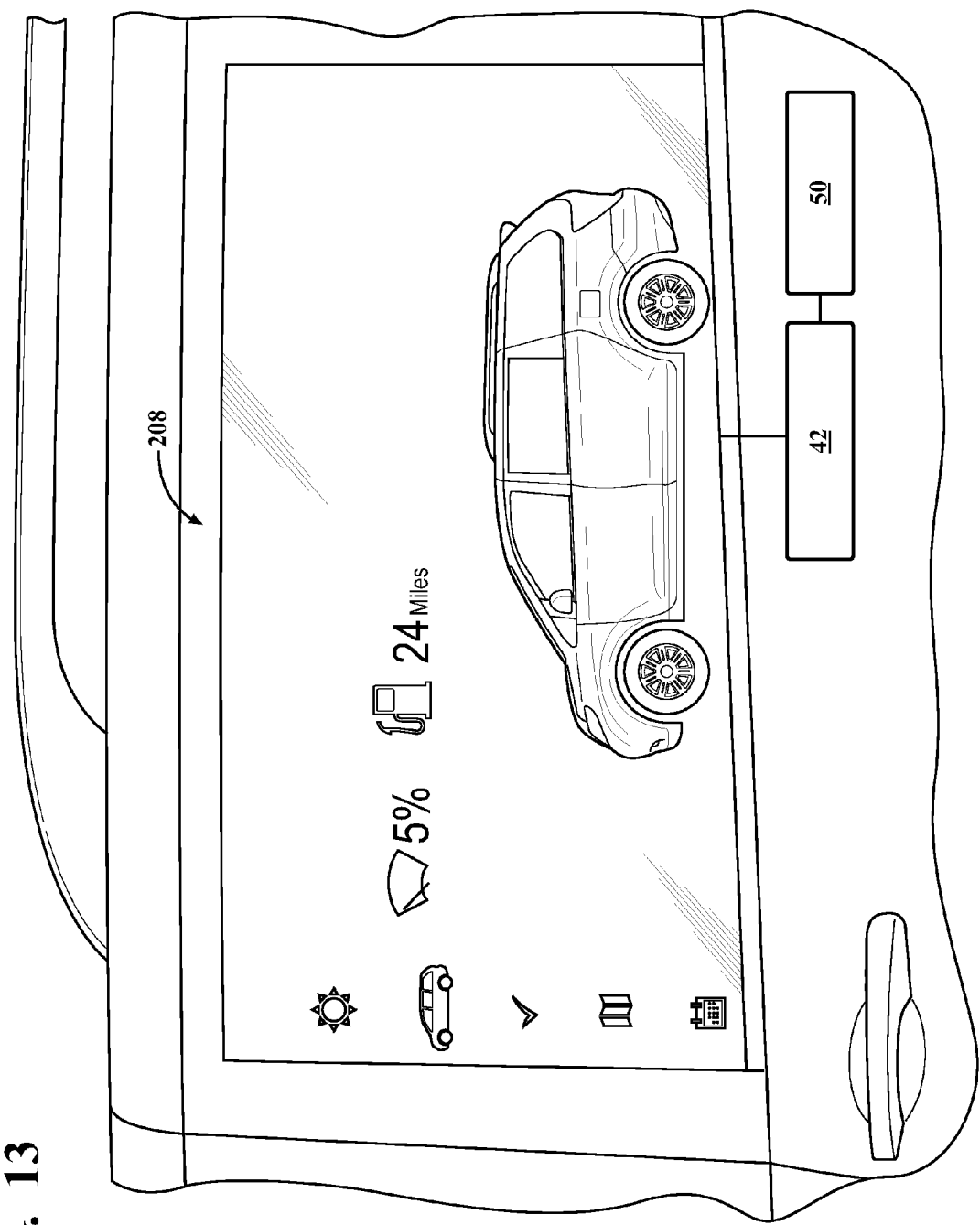
FIG. 13 is an example vehicle status page displayed by the interactive vehicle window display system.

With reference to FIG. 13, a vehicle status page 208 provides the user with a view of impending vehicle maintenance needs that requires attention. Notifications can include source details of the notification, severity, and options to resolve the potential issue. For example, given the notification of "Low Fuel," the system 30 can suggest a route to a nearby fuel station within the range of the vehicle. The vehicle status page 208 is here shown as accessed through a vehicle icon, however, other icons may be utilized.

Figure 14:
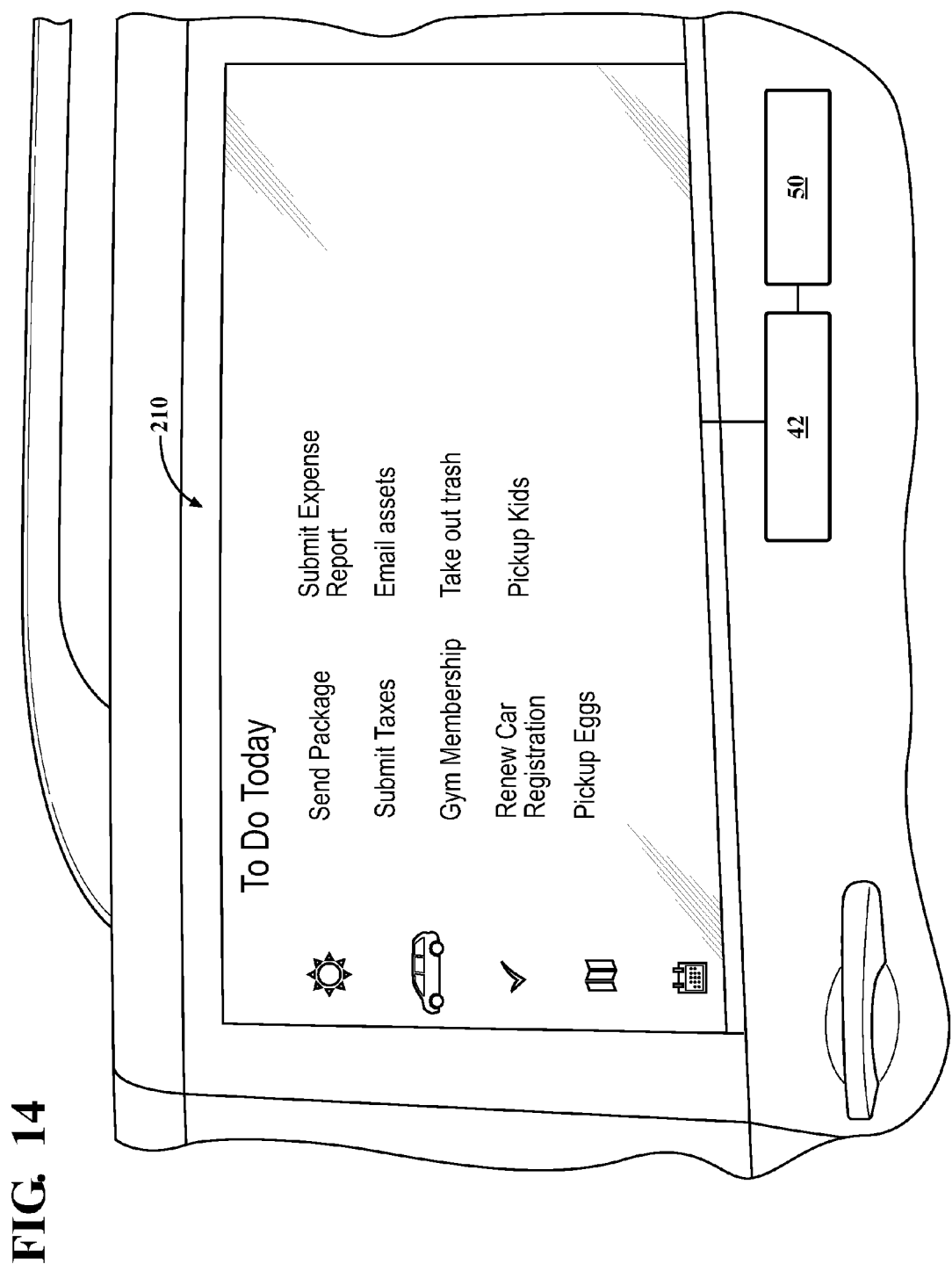
FIG. 14 is an example to-do page displayed by the interactive vehicle window display system.

With reference to FIG. 14, a to-do list page 210 presents the authorized user with information from any associated to-do list available on, for example, that user's personal electronic device 63, remote device, or web service. Here shown, the recognized user is tasked to "Send Package," "Submit Taxes," and "Renew Car Registration," among other items. The to-do list page 210 can alternatively be integrated into the route selection page if location information is included in a given list item in the personal electronic device to-do list. An example of this integration includes the provision of route details to a dry cleaner if the dry cleaning pickup is on the to-do list and the current route is proximate to the location of the dry cleaner location. The to-do list page is here shown accessed using a check-mark icon, however, other icons may be utilized.

As noted above, information of this nature, which can be included in a user profile, can in some variations be stored on or shared with a personal electronic device 63, remote server, or other cloud 70 based system, facilitating utilization in more than one vehicle. Any such information can be secured by being accessible through a password protected application running on the cloud 70 based system, by biometric authentication, or by other effective means. In some such variations, a first user can be granted partial or complete access to a second user's profile by password sharing, for example. Such sharing of access could enable a first user to write reminders or tasks from a remote location to the user profile of a second user, such as a family member, such that the reminders or tasks written by the first user will be displayed on a window when the second user approaches or enters the vehicle, or any vehicle equipped with system 30 enabled to access the user profile of the second user.

Figure 15:
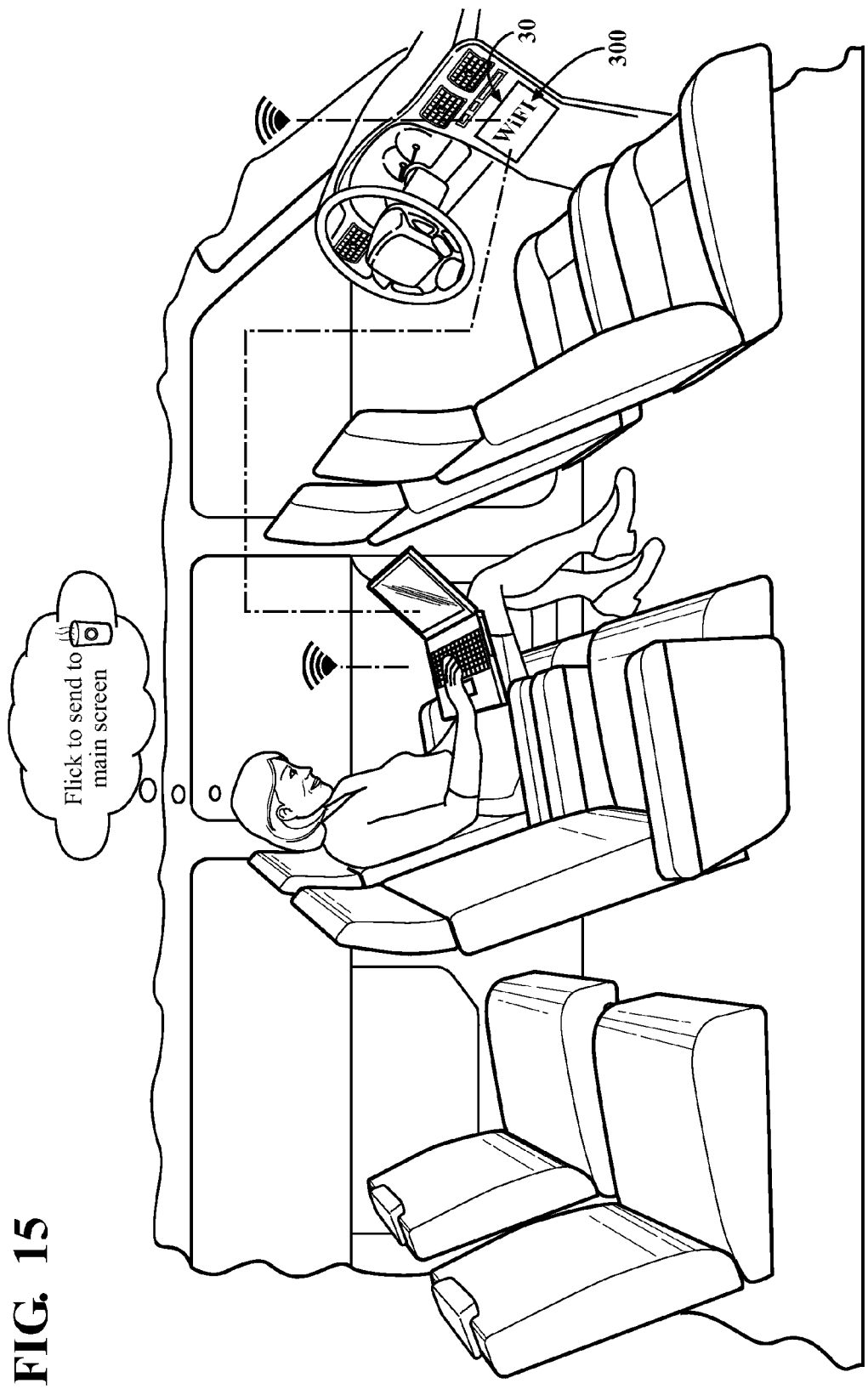
FIG. 15 is a partial interior view of a vehicle cabin illustrating an interactive environment for the driver and/or passengers to utilize functionalities of a vehicle head unit.

With reference to FIG. 15, user access to various vehicle functions can include direct or remote access to utilize functionalities of a vehicle head unit 300. With the interactivity between the vehicle head unit 300 and the system 30, and in particular between the vehicle head unit 300 and various interactive window displays, passengers can make selections with regard to vehicle systems typically performed by driver and in some cases only when the vehicle is stationary. Allowing only passengers to interact with certain vehicle systems while the vehicle is in motion increases safety by minimization of driver distraction. Passenger interaction can also enable greater functionality for the system 30. For example, a front-seat passenger can be offered more menu selections than the driver, while 2nd and 3rd row passengers can be offered even greater menu selections than the front-seat passenger. In these embodiments, the passengers can take over portions of the driver workload.

The vehicle passengers may, for example, interact with the system 30 and thereby the vehicle head unit 300 via an interactive window display or through a personal electronic device such as a smart phone or tablet which communicates therewith, through Bluetooth, RFID or other wireless technology standards to exchange data. Further, the system 30 may permit the formation of personal area networks (PANs) for vehicle passengers to share information. For example, a passenger's personal electronic device may include a mapping app operable to communicate with the vehicle navigation system on the vehicle head unit 300 with no features locked out such that the passenger can search destinations and selectively send to the vehicle navigation system via the vehicle head unit 300.

Interaction of the system 30 with the vehicle head unit 300 also allows the driver and/or passengers to select content for other vehicle passengers and/or the driver. For example, one of the passengers can select a destination to display on the navigation system for the driver while the vehicle is in motion. In another example, the driver can select entertainment content for display to child passengers. In yet another example, the passenger can control infotainment or climate control features controlled by the vehicle head unit 300.

Figure 16:
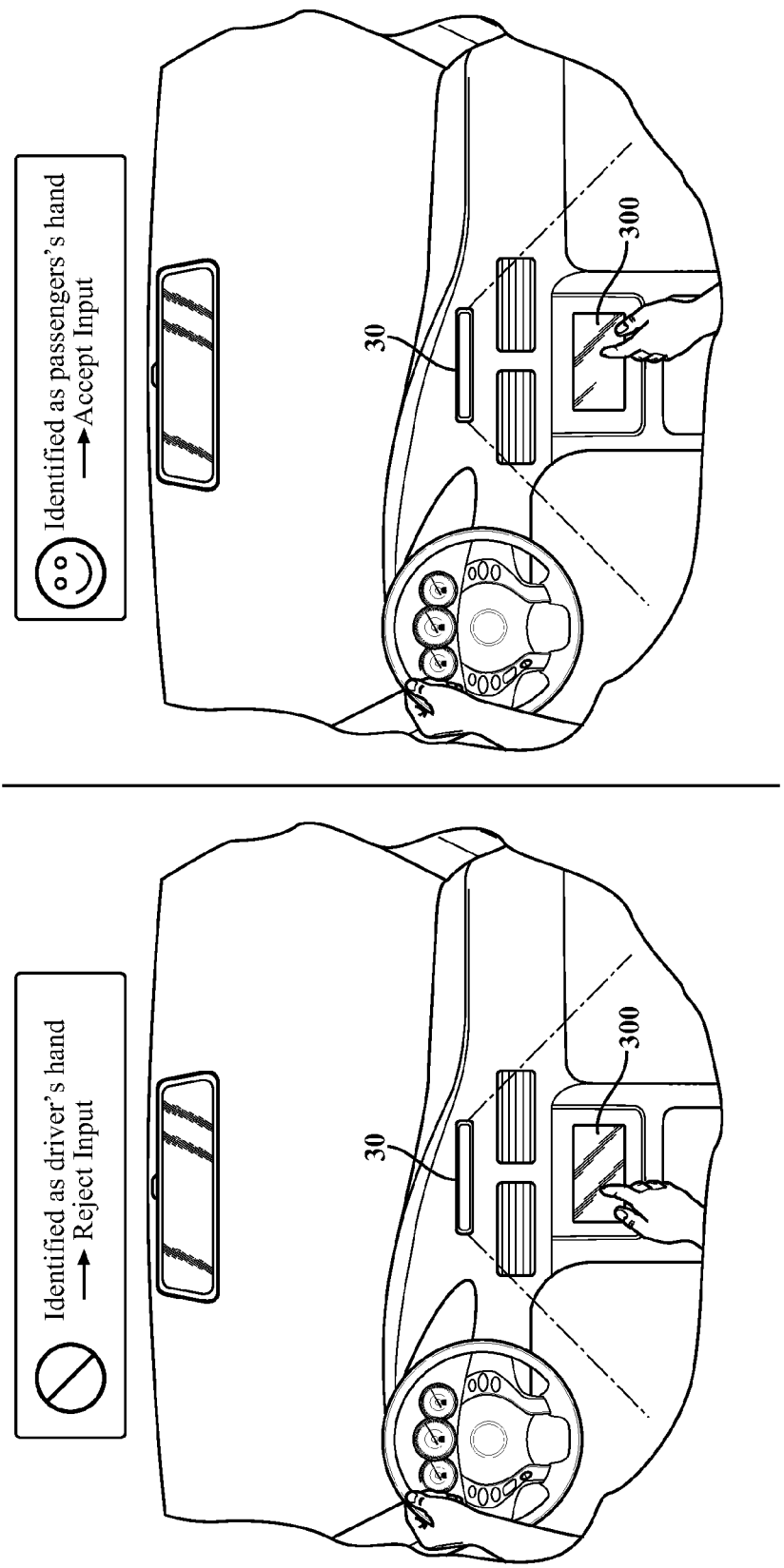
FIG. 16 is a partial interior view of the vehicle cabin illustrating discrimination of a driver and/or passenger to selectively permit utilization of functionalities of a vehicle head unit during vehicle operation.
Figure 17:
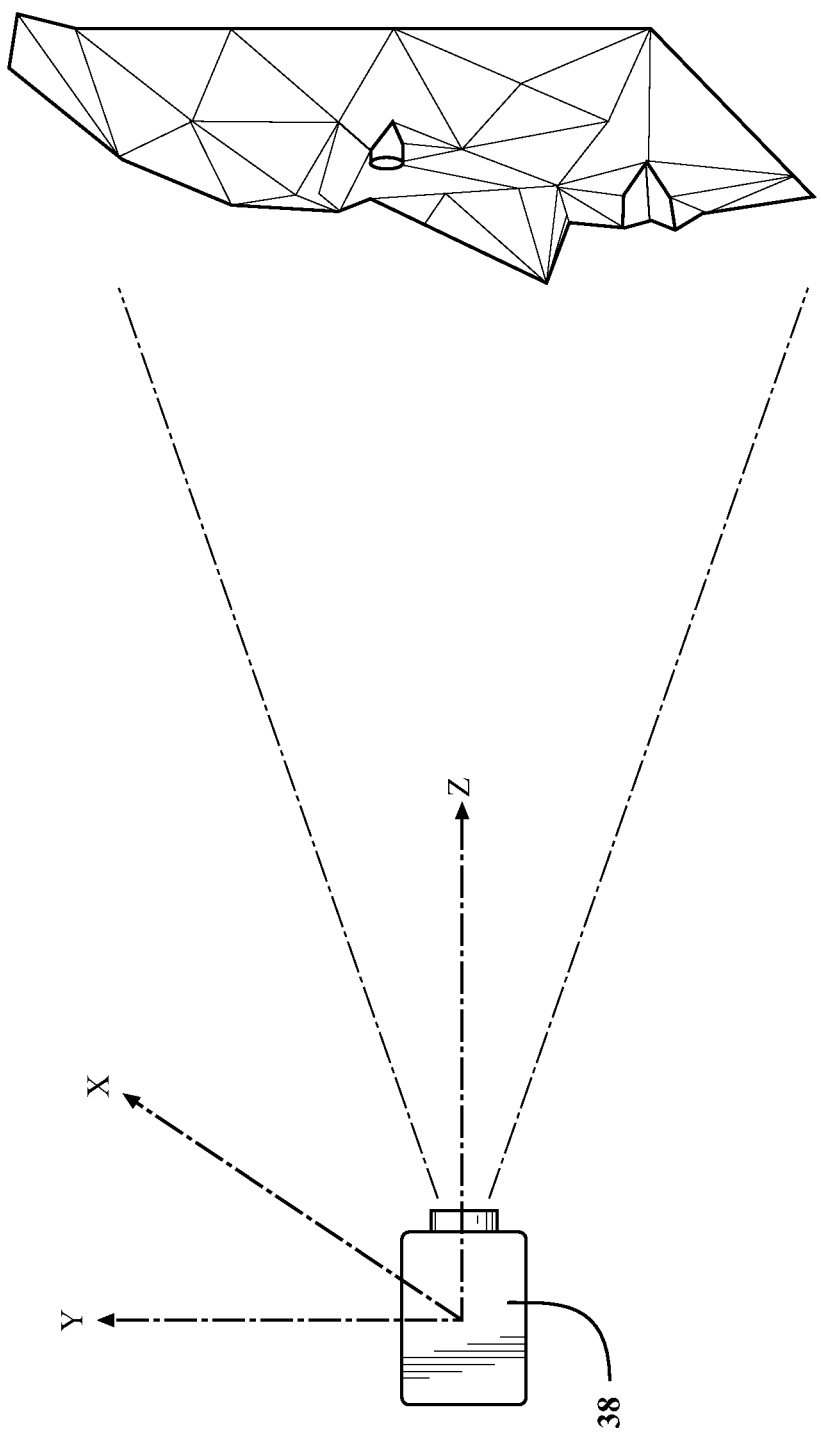
FIG. 17 is a pictorial representation of a vehicle passenger facial map for use with the system to track occupant location.
Figure 18:
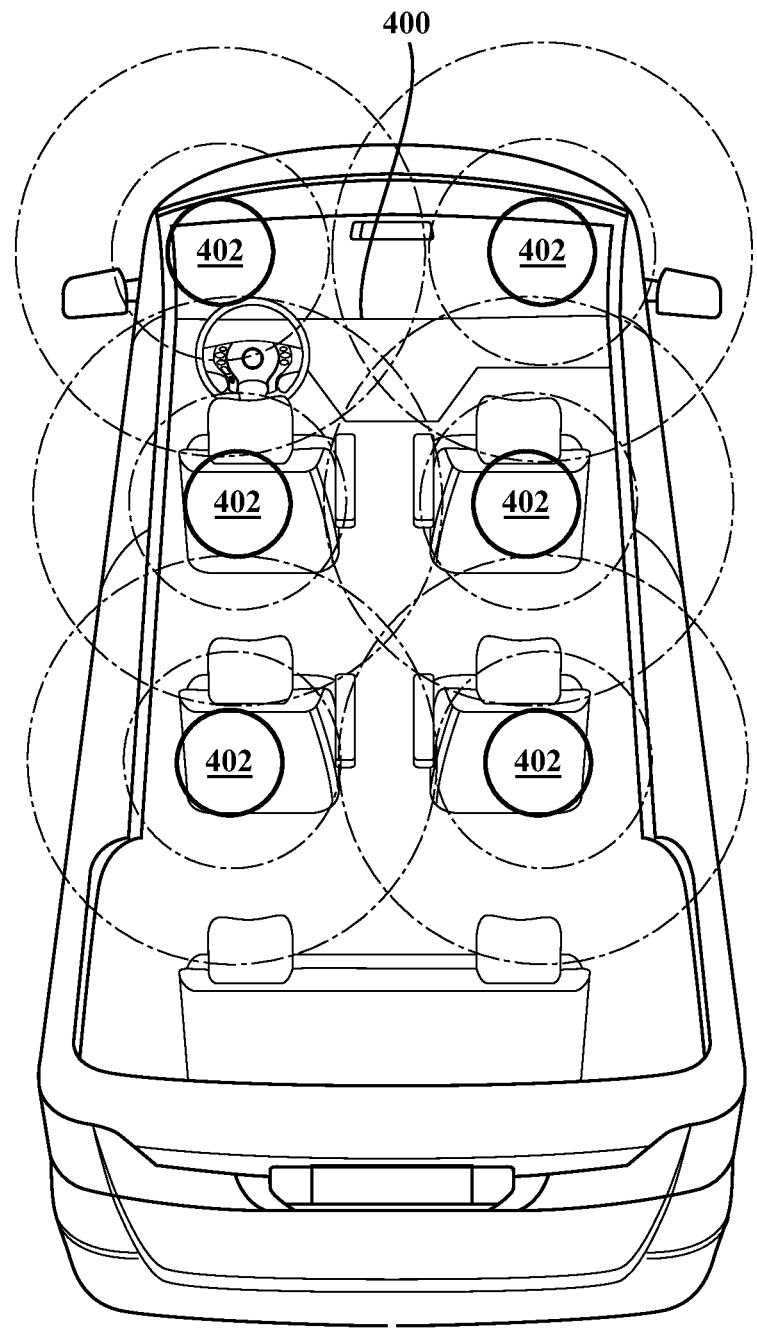
FIG. 18 is an overhead interior view of the vehicle illustrating a sensor arrangement to track occupant location within the vehicle cabin.

With reference to FIG. 16, and in one non-limiting example of the operation of the user location subsystem 39, to still further increase safety through driver distraction minimization, the system 30, by utilizing user location subsystem 39, is operable to track the location or position of the vehicle occupants within the vehicle cabin 400 (FIG. 18) through skeletal position (FIG. 16), facial map data (FIG. 17), pressure sensors, interactive window display input sensors, or others. For a three row vehicle, for example, three distinct areas are tracked—front row, middle row and rear row. Typically, at least two sensors 402 per row are required to track a state of each occupant within the vehicle 20. In some instances, each individual seat in the vehicle 20 can be tracked. The data from all sensors 402 may alternatively or additionally be combined to create one central map (2D or 3D) for use by the system 30. It should be appreciated that the sensors 402 may communicate with, or be a portion of, the user identification subsystem 38, the user location subsystem 39, or both.

Given that the vehicle occupants are typically seated and belted, the multi-point skeletal joint relationship and facial recognition map data provides a relatively accurate position of each occupant captured on an XYZ axis map that can track, to a desired level of precision, the state of each occupant at a specific snapshot in time. The state of each occupant facilitates further tailored operations for various vehicle functions. For example, the user location subsystem 39 detects and discriminates between a driver's hand from that of a vehicle front row passenger hand to selectively unlock various head unit functionality such as navigation route selection (FIG. 16). Dependent, for example, on which user (driver or passenger) is attempting to access the system 30 and whether the vehicle is in motion, content menu items of the vehicle head unit 300 are selectively displayed. For example, certain content such as route selection may be color coded for only passenger access, while other content such as zooming and scrolling may always be available regardless of user.

Figure 19:
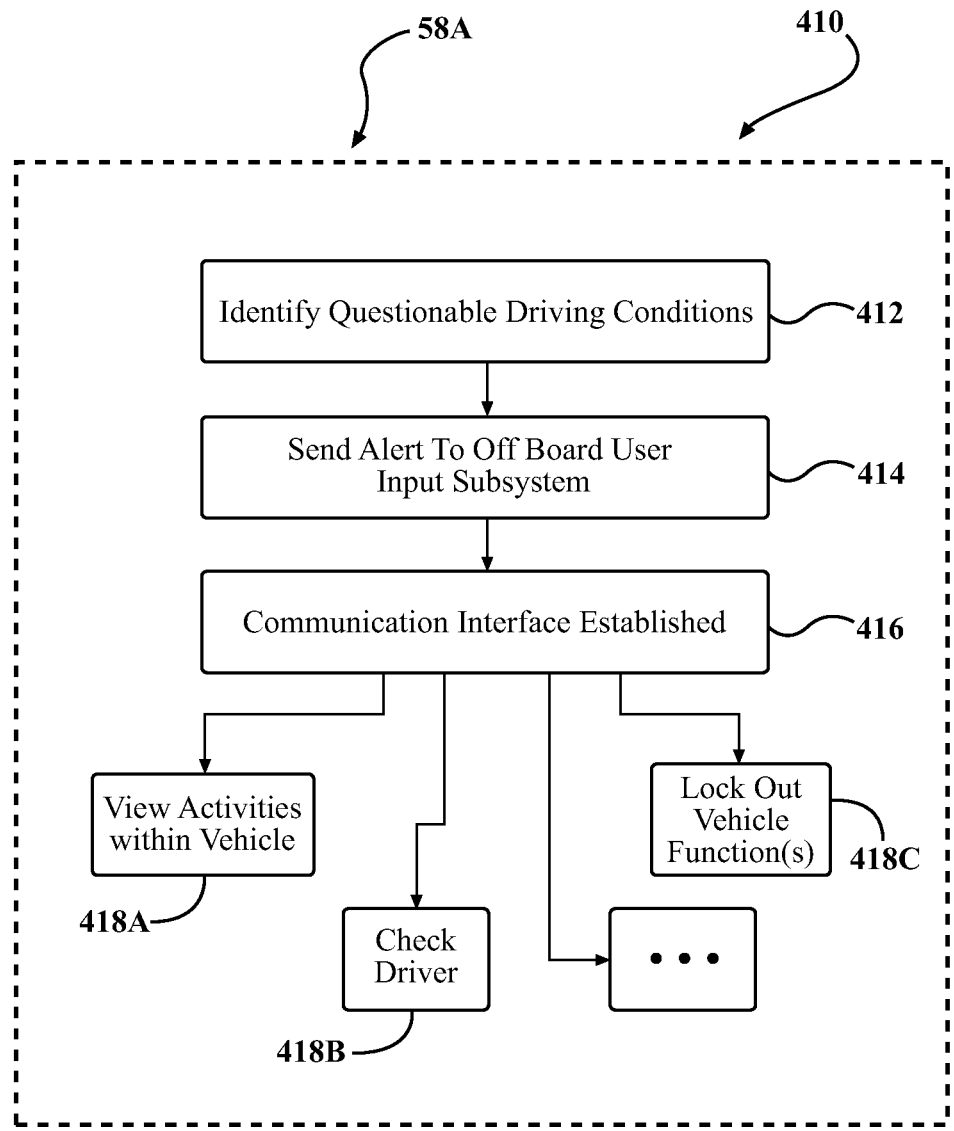
FIG. 19 a flow chart illustrating operations of the remote monitoring system according to one disclosed non-limiting embodiment.

With reference to FIG. 19, in another disclosed non-limiting embodiment, an algorithm 58A for remote monitoring of the vehicle 20 provides a method 410 for communication between a remote user via the user input subsystem 36 such as an off board personal electronic device 63 (FIG. 2). It should be appreciated that various cellular, satellite and wireless communication systems may be utilized for communication therebetween.

Initially, the method 410 for remote monitoring identifies a particular driving condition (step 412). The particular driving condition may be a questionable driving practice identified by speeding, weaving or other maneuver identified through the control module 50 and/or the vehicle head unit 300. It should be appreciated that certain metrics may be set via the user input subsystem 36 for identification of the questionable driving condition.

In response to identification of the questionable driving condition, the control module 50 communicates an alert to the user input subsystem 36 (step 414). The alert may be of various types such as a text message, an email, activation of an application, or other notification that, for example, may read "VEHICLE INDICATED SPEED 85 MPH" or "VEHICLE AUDIO SYSTEM SET AT HIGH DECIBELS". In another example, an elderly driver who is weaving between lines may generate an alert such as "VEHICLE WEAVING" to the driver's caregiver via the personal electronic device 63. It should be appreciated that various messages may be provided.

Either manually, or in response to the alert, the authorized user may remotely communicate with the vehicle cabin 400 (FIG. 18) (step 416). For example, the sensors 402 may be accessed through the off board personal electronic device 63 to view the activities within the vehicle 20 (step 418A). The sensors 402 may also be utilized to confirm the well-being of the driver (step 418B). Alternatively or in addition, the off board personal electronic device 63 may be used to remotely lock out one or more vehicle functions (step 418C) such as those features controlled by the vehicle head unit 300. For example, the vehicle audio system may be locked out, or the vehicle maximum speed may be limited. A remote authorized user off board the vehicle 20 may thereby view onboard vehicle activities with options to monitor and/or lock vehicle systems to facilitate safe driving.

Figure 20:
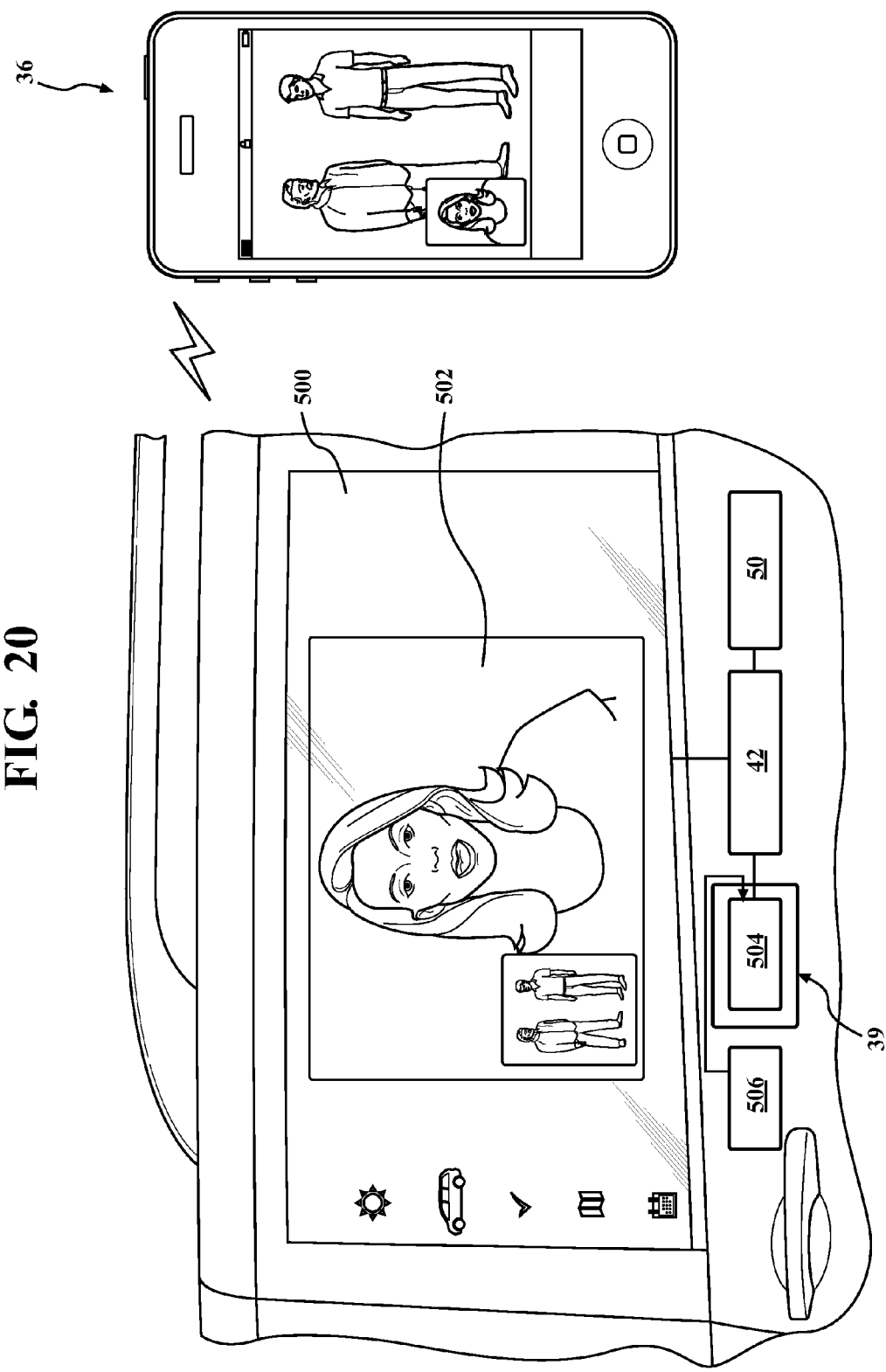
FIG. 20 is an example interactive remote communication page displayed by the interactive vehicle window display system.

With reference to FIG. 20, an interactive remote communication page 500 provides a two-way communication interface 502 for voice, video, and/or multimedia communication via an interactive remote communication subsystem 504 that may be incorporated into the control subsystem 34 or otherwise connected thereto. The interactive remote communication subsystem 504 thereby provides for real time interaction with the user input subsystem 36 (FIG. 2) to communication between a user and on-scene personnel should the vehicle 20 be operated via an automated self-drive system 506 (illustrated schematically). The automated self-drive system 506 may be incorporated into the control subsystem 34 or otherwise facilitated to provide for unmanned, automated operations.

Automated vehicles are those in which at least some aspects of a safety-critical control function, e.g., steering, throttle, or braking, occur without direct driver input. Automated vehicles may use on-board sensors, cameras, GPS, and telecommunications to obtain information in order to make their own judgments regarding safety-critical situations and operate appropriately by effectuating control at some automation level. The range of vehicle automation has been classified by the National Highway Traffic Safety Administration from no control systems automation through full automation that performs all safety-critical driving functions and monitor roadway conditions for an entire trip. Such full automation includes both occupied and unoccupied vehicles and requires only that the user provide destination or navigation input, but need not provide control at any time during the trip.

In one example, should the unoccupied automated vehicle be involved in an incident that requires remote communication with the user, the interactive remote communication page 500 provides a two-way communication interface between the user and the on-scene personnel such as emergency responders. In another example, should the unoccupied automated vehicle be used to collect a child or perform another such errand, the interactive remote communication page 500 provides for communication with the on-scene personnel. As defined herein, on-scene personnel are those who are near the vehicle 20.

Figure 21:
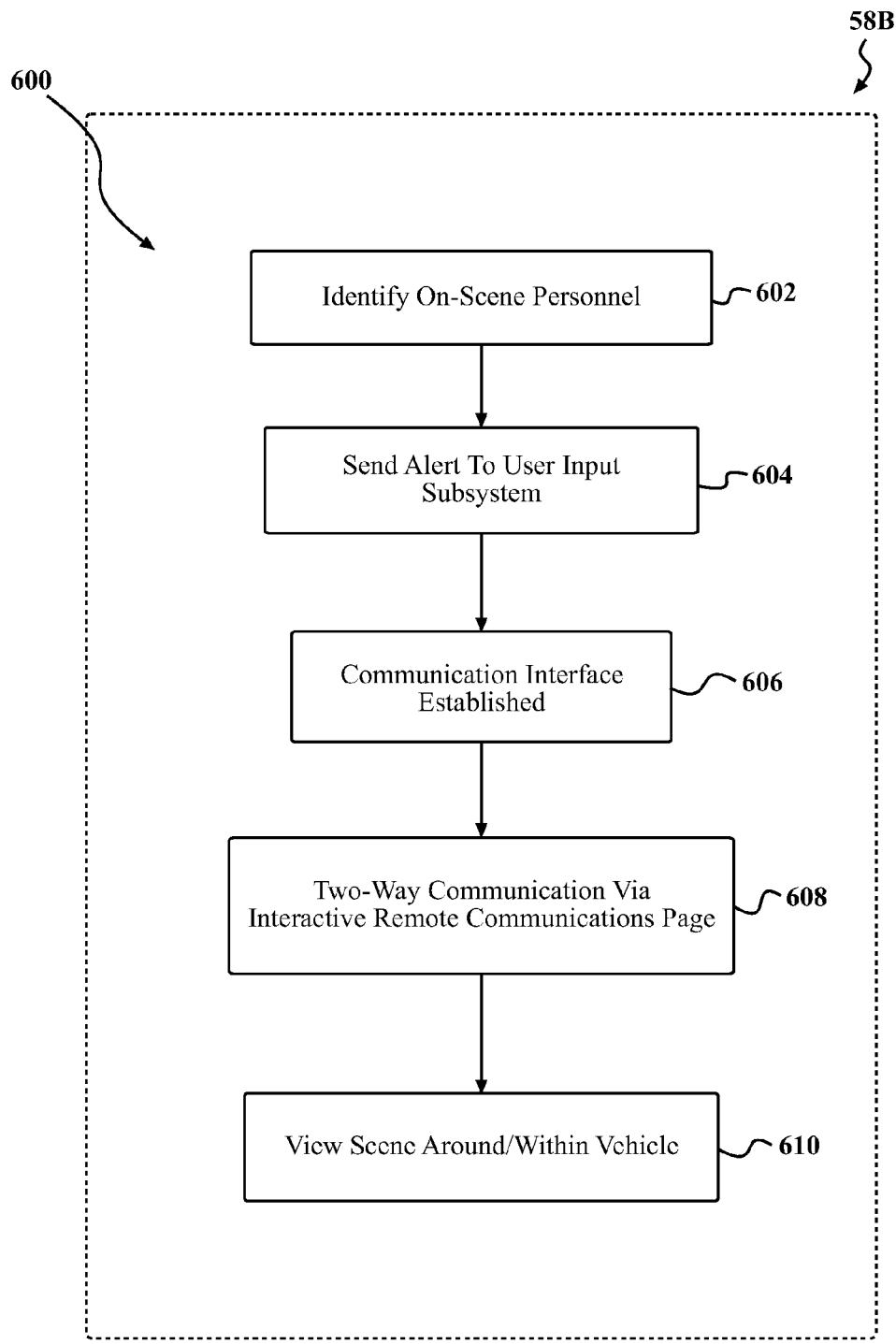
FIG. 21 is a flow chart indicative of a method of operation of the interactive remote communication subsystem.

With reference to FIG. 21, in one disclosed non-limiting embodiment, an algorithm 58A for user interaction with on-scene personnel provides a method 600 for communication between the remote user and the on-scene personnel while the vehicle 20 is operable in an automated self-drive vehicle mode. Initially, the user location subsystem 39 identifies the location of one or more users around the vehicle 20 that indicates an incident has occurred or that an on-scene person wishes to communicate with the user (step 602).

Next, the interactive remote communication subsystem 504 sends an alert to the personal electronic device 63 (step 604) to establish two-way communication therebetween (step 606). The user may then communicate with the on-scene personnel via the interactive remote communication page 500 (step 608). In addition, the user may remotely access the sensors 66 of the user location subsystem 39 to further view the situation in and/or around the vehicle 20 (step 610).

The use of the terms "a," "an," "the," and similar references in the context of the description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:
1. A system for a vehicle, comprising:
a control subsystem;

an automated self-drive system in communication with the control subsystem and configured to facilitate unmanned automated operations;

a user input subsystem including at least one offboard device;

a user location subsystem configured to identify a location of an occurrence of an incident requiring on-scene personnel;

an interactive remote communication subsystem in communication with the control subsystem and configured to send an alert to the at least one offboard device to establish two-way communication between the on-scene personnel and a remote user;

an interactive display subsystem in communication with the interactive remote communication subsystem and user location subsystem, the interactive display subsystem configured to generate output associated with a two-way communication interface for remote communication with the remote user via the user input subsystem.

2. The system as recited in claim 1, wherein the offboard device comprises a personal electronic device of the remote user, and the output includes at least one of an interactive remote communication page, video, audio, and videoconferencing sent to the personal electronic device.

3. A method for remote monitoring of a vehicle, the method comprising:

providing a remote user with a user input subsystem configured to send and receive information to and from the vehicle;

setting, by the remote user via the user input system, metrics related to at least one questionable driving practice;

identifying, by one of a vehicle head unit and a vehicle control module coupled to at least one vehicle sensor, a questionable driving practice with respect to an operation of the vehicle that exceeds the metrics set by the remote user; and alerting the remote user of the questionable driving practice by displaying a visual indication on an off board personal electronic device.

4. The method as recited in claim 3, wherein the questionable driving practice includes at least one of a vehicle speed and a decibel level of an audio system of the vehicle.

5. The method as recited in claim 3, further comprising locking out a vehicle feature from the off board personal electronic device.

6. The method according to claim 4, further comprising limiting a maximum speed of the vehicle.

7. The method as recited in claim 3, wherein the at least one vehicle sensor is configured to confirm a well-being status of a driver, and the step of alerting the off board personal electronic device as to the questionable driving practice includes an indication of the well-being status of the driver.

* * * * *